US012187466B2

(12) United States Patent
Bultitude et al.

(10) Patent No.: US 12,187,466 B2
(45) Date of Patent: Jan. 7, 2025

(54) MATERIAL TRANSFER INTERFACES FOR SPACE VEHICLES, AND ASSOCIATED SYSTEMS AND METHODS

(71) Applicant: Orbit Fab, Inc., Santa Clara, CA (US)

(72) Inventors: James Bultitude, San Francisco, CA (US); Phil Putman, Sandusky, OH (US); Larry Knauer, Toledo, OH (US); Wanda Sigur, Seabrook, TX (US); Sebastian Poler, San Francisco, CA (US); Garrett Ailts, Riverdale, UT (US); Avery Louie, Somerville, MA (US); Daniel Faber, San Francisco, CA (US); Alexander Deuitch, Westminster, CO (US)

(73) Assignee: Orbit Fab, Inc., Lafayette, CO (US)

( * ) Notice: Subject to any disclaimer, the term of this patent is extended or adjusted under 35 U.S.C. 154(b) by 584 days.

(21) Appl. No.: 17/211,547

(22) Filed: Mar. 24, 2021

(65) Prior Publication Data
US 2021/0300602 A1    Sep. 30, 2021

Related U.S. Application Data

(60) Provisional application No. 62/994,668, filed on Mar. 25, 2020.

(51) Int. Cl.
*B64G 1/64* (2006.01)

(52) U.S. Cl.
CPC ............ *B64G 1/646* (2013.01); *B64G 1/641* (2013.01)

(58) Field of Classification Search
CPC ...... B64G 1/646; B64G 1/641; B64G 1/1078; B64G 1/402; B64G 1/64
See application file for complete search history.

(56) References Cited

U.S. PATENT DOCUMENTS

| 2,199,588 A | * | 5/1940 | Cobham | ................ B64D 39/06 251/149.6 |
| 2,634,927 A | | 4/1953 | Smith | |

(Continued)

FOREIGN PATENT DOCUMENTS

| CN | 103625656 | 3/2014 |
| CN | 109703791 | 5/2019 |

(Continued)

OTHER PUBLICATIONS

International Search Report and Written Opinion for International Patent Application No. PCT/US22/37019, Applicant: Orbit Fab, Inc., mailed Oct. 26, 2022, 14 pages.

(Continued)

*Primary Examiner* — Aditya S Bhat
(74) *Attorney, Agent, or Firm* — Perkins Coie LLP

(57) ABSTRACT

Material transfer interfaces for space vehicles, and associated systems and methods, are disclosed. A representative system includes a coupling mechanism including a support structure, a latch-arm base movably connected to the support structure, and a latch arm pivotably connected to the latch-arm base. Another representative system includes a service valve portion, a coupling portion configured to receive the service valve portion, and a coupling mechanism for coupling the service valve portion to the coupling portion. The coupling mechanism can include latch arms positioned to pivot between a position in which the latch arms are pivoted outwardly and a position in which the latch arms are pivoted inwardly to capture the service valve portion. The latch arm can be carried by a latch-arm base that translates relative to a support structure of the coupling portion. Material transfer interfaces can include self-aligning ports having faces that engage each other with cup-and-cone structures.

19 Claims, 15 Drawing Sheets

(56) References Cited

U.S. PATENT DOCUMENTS

| | | | |
|---|---|---|---|
| 2,803,473 | A | 8/1957 | Hohman |
| 3,737,117 | A | 6/1973 | Belew |
| 4,023,584 | A | 5/1977 | Rogers |
| 4,195,804 | A | 4/1980 | Hujsak |
| 4,976,399 | A | 12/1990 | Bay |
| 5,222,277 | A * | 6/1993 | Harvey ............... E05F 3/20 188/274 |
| 5,299,764 | A | 4/1994 | Scott |
| 6,193,193 | B1 | 2/2001 | Soranno et al. |
| 6,275,751 | B1 | 8/2001 | Stallard et al. |
| 7,114,682 | B1 | 10/2006 | Kistler et al. |
| 7,392,964 | B1 | 7/2008 | Anderman |
| 7,413,148 | B2 | 8/2008 | Behrens et al. |
| 7,559,509 | B1 | 7/2009 | Kistler et al. |
| 7,575,200 | B2 | 8/2009 | Behrens et al. |
| 7,669,804 | B2 | 3/2010 | Strack et al. |
| 7,857,261 | B2 | 12/2010 | Tchoryk |
| 7,861,975 | B2 | 1/2011 | Behrens et al. |
| 8,006,937 | B1 | 8/2011 | Romano et al. |
| 8,333,347 | B2 | 12/2012 | Ritter |
| 8,820,353 | B2 | 9/2014 | Yandle et al. |
| 8,899,527 | B2 | 12/2014 | Allen et al. |
| 9,231,323 | B1 | 1/2016 | Jaeger |
| 10,308,125 | B2 | 6/2019 | Ahrens |
| 10,604,281 | B2 | 3/2020 | Raven et al. |
| 10,654,584 | B2 | 5/2020 | Bosma |
| 10,850,869 | B2 | 12/2020 | Nicholson et al. |
| 11,530,053 | B2 | 12/2022 | Wingo et al. |
| 11,643,226 | B1 | 5/2023 | Markcity |
| 12,037,142 | B2 * | 7/2024 | Faber ............... B64C 39/024 |
| 2002/0164204 | A1 | 11/2002 | Kaszubowski |
| 2002/0179775 | A1 | 12/2002 | Turner |
| 2003/0029969 | A1 | 2/2003 | Turner |
| 2005/0263649 | A1 | 12/2005 | Ritter et al. |
| 2006/0151671 | A1 * | 7/2006 | Kosmas ............... B64G 4/00 244/172.6 |
| 2006/0278765 | A1 | 12/2006 | Strack et al. |
| 2007/0051854 | A1 | 3/2007 | Behrens et al. |
| 2007/0228219 | A1 | 10/2007 | Behrens et al. |
| 2007/0228220 | A1 | 10/2007 | Behrens et al. |
| 2008/0121759 | A1 | 5/2008 | Behrens et al. |
| 2011/0031352 | A1 | 2/2011 | Behrens et al. |
| 2012/0000575 | A1 | 1/2012 | Yandle et al. |
| 2012/0168564 | A1 * | 7/2012 | Feldmann ............... B64D 39/04 244/135 A |
| 2012/0292449 | A1 | 11/2012 | Levin et al. |
| 2013/0119204 | A1 | 5/2013 | Allen et al. |
| 2016/0028175 | A1 * | 1/2016 | Jaeger ............... H01R 13/005 137/594 |
| 2018/0087683 | A1 * | 3/2018 | Raven ............... B64G 1/402 |
| 2018/0362910 | A1 | 12/2018 | Bores |
| 2019/0023422 | A1 | 1/2019 | Nicolson et al. |
| 2019/0077523 | A1 * | 3/2019 | Faber ............... B64G 1/1078 |
| 2020/0346781 | A1 | 11/2020 | Bosma |
| 2021/0070465 | A1 | 3/2021 | Bosma |
| 2022/0332444 | A1 | 10/2022 | Roopnarine |
| 2022/0371749 | A1 | 11/2022 | Faber |
| 2023/0016398 | A1 | 1/2023 | Faber |
| 2023/0028104 | A1 | 1/2023 | Turner |

FOREIGN PATENT DOCUMENTS

| | | |
|---|---|---|
| EP | 3012194 | 4/2016 |
| JP | H04293700 | 10/1992 |
| WO | 2016020390 | 2/2016 |

OTHER PUBLICATIONS

International Search Report and Written Opinion for International Patent Application No. PCT/US21/023974, Applicant: Orbit Fab, Inc., mailed Aug. 18, 2021, 23 pages.

NASA—Bring NASA Technology Down to Earth, "Cooperative Service Valve for In-Orbit Cooperative Satellite Fueling," https://technology.nasa.gov/patent/GSC-TOPS-170, accessed: Mar. 25, 2020, 3 pages.

NASA: Robotics, Automation, and Control, "Cooperative Services Valve for In-Orbit Cooperative Satellite Fueling—Technology Solution," https://ntts-prod.s3.amazonaws.com/t2p/prod/t2media/tops/pdf/GSC-TOPS-170.pdf, accessed: Mar. 25, 2020, 2 pages.

NASA Pamphlet, "Partnering and Licensing with NASA Goddard—Satellite Servicing—Solutions for Commercial Space and Other Applications," https://sspd.gsfc.nasa.gov/documents/SSPD_Pamphlet4_FINAL.pdf, accessed: Mar. 25, 2020, 8 pages.

Stoor, Bradley J., "In-Space Manufacturing: A Roadmap to the Future," Air Command and Staff College Air University—Masters of Operational Arts and Sciences, AU/ACSC/STOOR,B/AY18, https://apps.dtic.mil/dtic/tr/fulltext/u2/1055025.pdf, Apr. 2018, 42 pages.

YouTube Video: 2019 CubeSat Developers Workshop—Day 2, https://youtu.be/JgXkUZIN7tk?t=26700, streamed live Apr. 24, 2019 (Addendum: Still frame at timestamp 7:35:21), 2 pages.

TechCrunch Video, "Startup Battlefield: Finals—Orbit Fab", https://techcrunch.com/video/startup-battlefield-finals-orbit-jab/, Oct. 4, 2019, (Addendum: Still frame at timestamp 4:13), 4 pages.

EO: Sharing Earth Observation Resources, "CubeSat Concept and the Provision of Deployers Services," https://directory.eoportal.org/web/eoportal/satellite-missions/c-missions/cubesat-concept, accessed: Mar. 25, 2020, 23 pages.

Cobham, "Service Valve," https://www.cobham.com/mission-systems/space-propulsion-systems/service-valves/service-valves-datasheet/docview/, 2009, 1 page.

Altius Space Machines, "MagTag Satellite Servicing Interface Workshop at Smallsat Conference," https://aerospace.org/sites/default/files/2019-05/Davis-Mayberry-Penn_OOS_04242019.pdf, Jul. 23, 2018, 3 pages.

Altius Space Machines, "Open Source Analysis of Iridium Failures and the Implications for Big LEO Constellations," https://web.archive.org/web/20190828151326/http://www.altius-space.com/wp-content/uploads/2018/02/AltiusSCAFPresentation-ImplicationsOfIridiumOnBigLEO_12Dec2017.pdf, Dec. 12, 2017, 24 pages.

Altius, "SCAF 2017 Presentation: Open Source Analysis of Iridium Failures and the Implications for Big LEO Constellations," http://altius-space.com/blog/scaf-2017-presentation-open-source-analysis-iridium-failures-implications-big-leo-constellations/, published Feb. 16, 2018, 5 pages.

Extended European Search Report and Opinion for European Patent Application No. 21774188.3, Applicant: Orbit Fab, Inc., mailed Feb. 26, 2024, 25 pages.

* cited by examiner

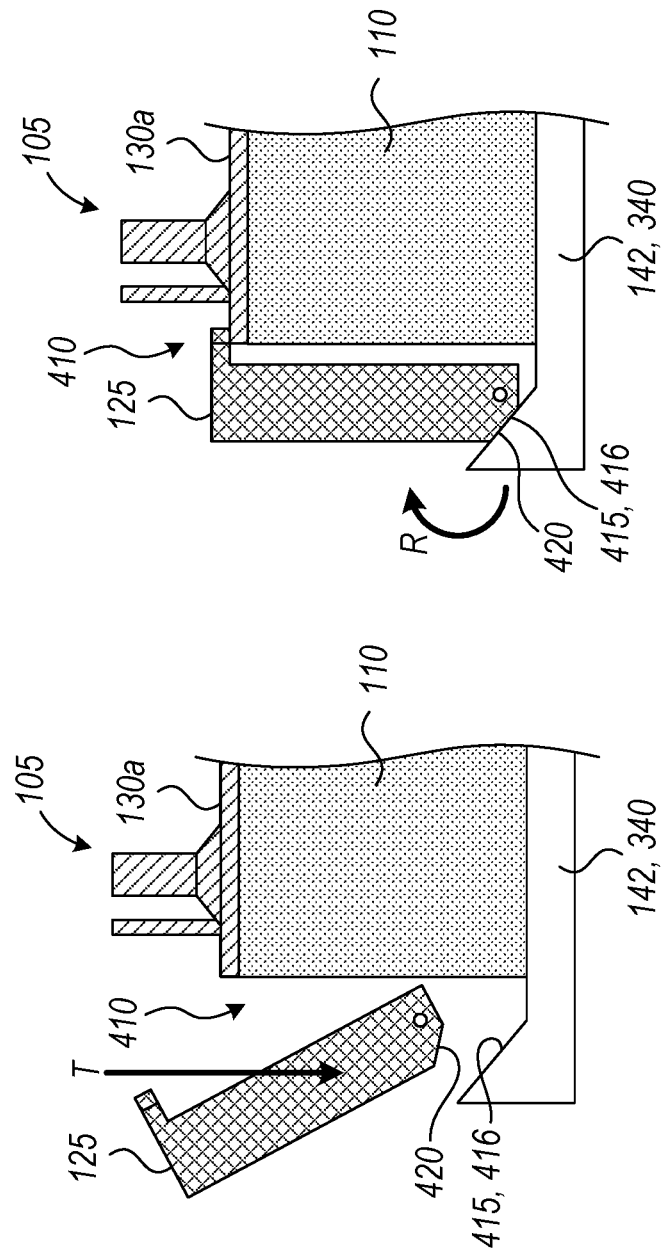

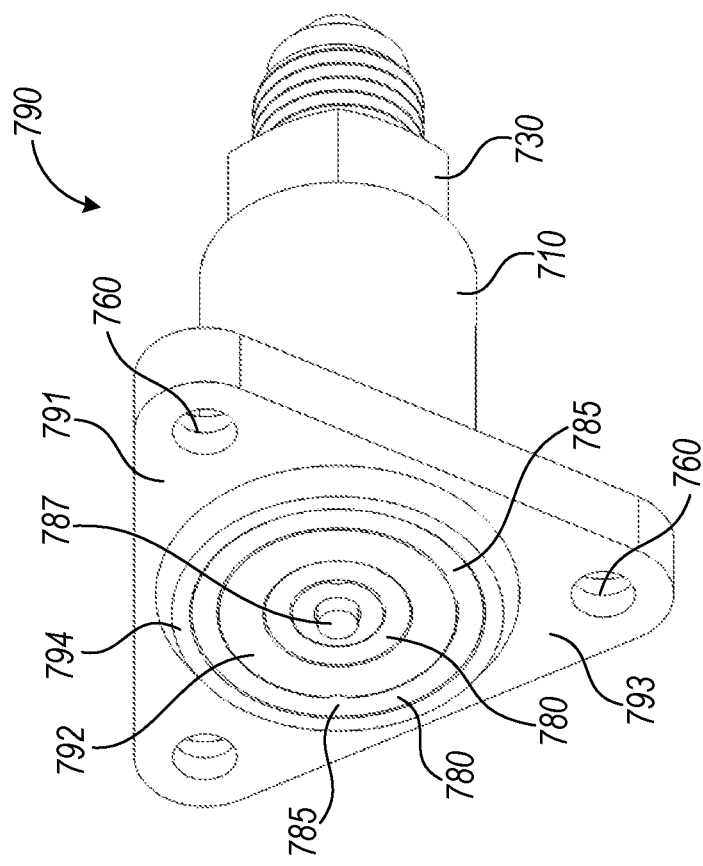
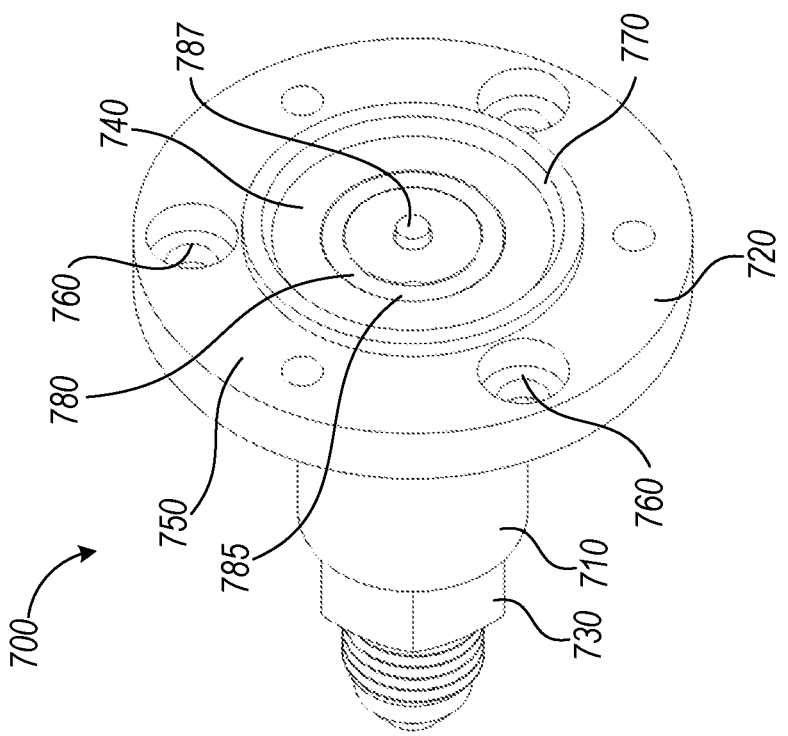
Fig. 7B
Fig. 7A

MATERIAL TRANSFER INTERFACES FOR SPACE VEHICLES, AND ASSOCIATED SYSTEMS AND METHODS

CROSS-REFERENCE TO RELATED APPLICATION

The present application claims priority to U.S. Provisional Patent Application No. 62/994,668, filed Mar. 25, 2020, which is incorporated herein by reference in its entirety.

TECHNICAL FIELD

The present disclosure is directed generally to material transfer interfaces for space vehicles, and associated systems and methods.

BACKGROUND

Existing space systems include several drawbacks. For example, launch vehicles may have limited volume and mass capacities. Spacecraft, such as satellites and/or other machines for traveling in space, are often launched to orbit with a limited quantity of fuel on board due to size and/or cost restrictions that must be compromised when designing the spacecraft for a particular mission. Accordingly, space missions may have limited lifetimes and/or utility due to limited fuel. Likewise, features and functions of spacecraft, such as the type and quantity of payload the spacecraft itself may carry, may be limited and/or compromised because the spacecraft may need to be launched full of all of the fuel it will need for its entire lifetime. There is a need for systems and methods to refuel spacecraft, especially spacecraft with long lifecycles intended to be on orbit for extended periods of time.

Refueling a satellite is difficult or impossible with existing systems. For example, existing docking systems and procedures are complicated and two satellites or vehicles may have incompatible docking systems or no docking systems. Existing docking systems are also difficult or impossible to use autonomously. Existing docking systems also do not simultaneously provide adequate docking capabilities and material transfer interfaces (e.g., filling and/or draining). Accordingly, there is a need for systems and methods for transferring materials in space that overcome these disadvantages of existing space systems.

BRIEF DESCRIPTION OF THE DRAWINGS

In the drawings, wherein the same reference number indicates the same element throughout the views:

FIGS. 4C and 4D together illustrate schematic views of a coupling mechanism configured in accordance with embodiments of the present technology, carrying out a coupling or decoupling sequence.

FIG. 7A illustrates a perspective view of a port configured in accordance with an embodiment of the present technology.

FIG. 7B illustrates a perspective view of another port configured in accordance with an embodiment of the present technology.

DETAILED DESCRIPTION

Figure 1A:
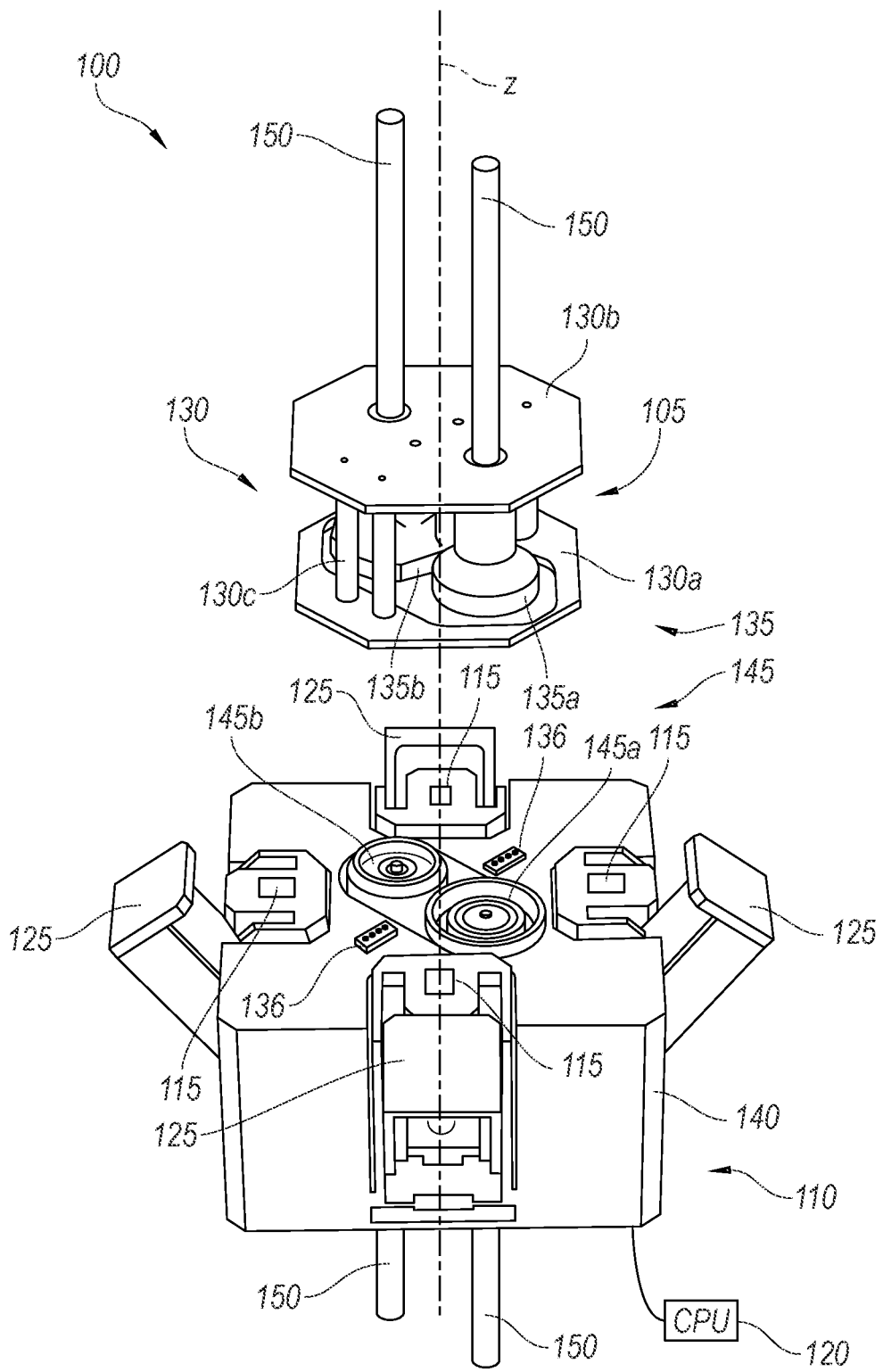
FIGS. 1A-1C illustrate partially schematic perspective views of components of a material transfer interface system, including a service valve portion and a space coupling portion, in various stages of engaging and/or docking with each other, in accordance with embodiments of the present technology.

Several embodiments of the present technology are directed to systems and methods for transferring materials (e.g., liquids, gases, solids, and/or other materials) in space or on a planetary or lunar surface. Any of the features described herein can be combined in suitable manners with any of the other features described herein without deviating from the scope of the present technology.

Many specific details of some embodiments of the technology are set forth in the following description and FIGS. 1-11 to provide a thorough understanding of these embodiments. Well-known structures, systems, and methods that are often associated with such embodiments, but that may unnecessarily obscure some significant aspects of the disclosure, are not set forth in the following description for purposes of clarity. Moreover, although the following disclosure sets forth some embodiments of the technology, some embodiments of the technology can have different configurations and/or different components than those described in this section. As such, the technology can include embodiments with additional elements, and/or without several of the elements described below with reference to FIGS. 1-11.

Several embodiments of the technology described below can take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers and the like). Information handled by these computers can be presented at any suitable display medium, including an LCD.

The technology can also be practiced in distributed environments, where tasks or modules are performed by remote processing devices that are linked through a communications network. In a distributed computing environment, program modules and/or subroutines can be located in local and remote memory storage devices. Aspects of the technology described below can be stored and/or distributed on computer-readable media, including magnetic or optically readable or removable computer disks, as well as distributed electronically over networks. Data structures and transmissions of data particular to aspects of the technology are also encompassed within the scope of the embodiments of the technology.

Reference is made herein to "space." Space includes orbital space near or around Earth, the Moon, or another planetary body. A person of ordinary skill in the art will also recognize that embodiments of the present technology can be implemented on a planetary or lunar surface, or on another surface. Reference is also made to fuel or propellant. A person of ordinary skill in the art will understand that the terms fuel and propellant can be used interchangeably when referring to a substance for powering and/or propelling a spacecraft, and can include oxidizers that function as propellant when combined with fuels. A person of ordinary skill in the art will also understand that when reference is made to transferring fuel or propellant, corresponding embodiments can be used to transfer other materials, such as pressurant, water, coolant, waste, or other materials that can be transferred between two containers. In addition, a person of ordinary skill in the art will understand that a spacecraft can include any human-made object in space.

As used herein, the term "and/or" when used in the phrase "A and/or B" means "A, or B, or both A and B." A similar manner of interpretation applies to the term "and/or" when used in a list of more than two terms.

A. System Overview

The present disclosure describes systems and/or devices such as material transfer interfaces configured to facilitate transfer of materials (such as fluids, including fuel, propellant, or other materials) between containers (such as containers carried by spacecraft) in an extraterrestrial environment, such as in space, or on extraterrestrial bodies such as moons, planets, or asteroids, or on Earth or within Earth's atmosphere. Although some embodiments contemplate autonomous material transfer activities, activities performed by systems and/or spacecraft disclosed herein can be semi-autonomous or non-autonomous, and can include assistance by robots, artificial intelligence, and/or humans.

Several of the material transfer interfaces according to embodiments of the present technology can be implemented in spacecraft that have containers for receiving and/or storing materials such as liquids, gases, and/or other materials. The present technology also includes coupling systems for connecting spacecraft to each other, such as in a rendezvous and/or docking maneuver. Embodiments of the present technology provide spacecraft with the capability to refuel and extend their useful life and/or to expel waste materials, among other advantages.

Figure 1B:
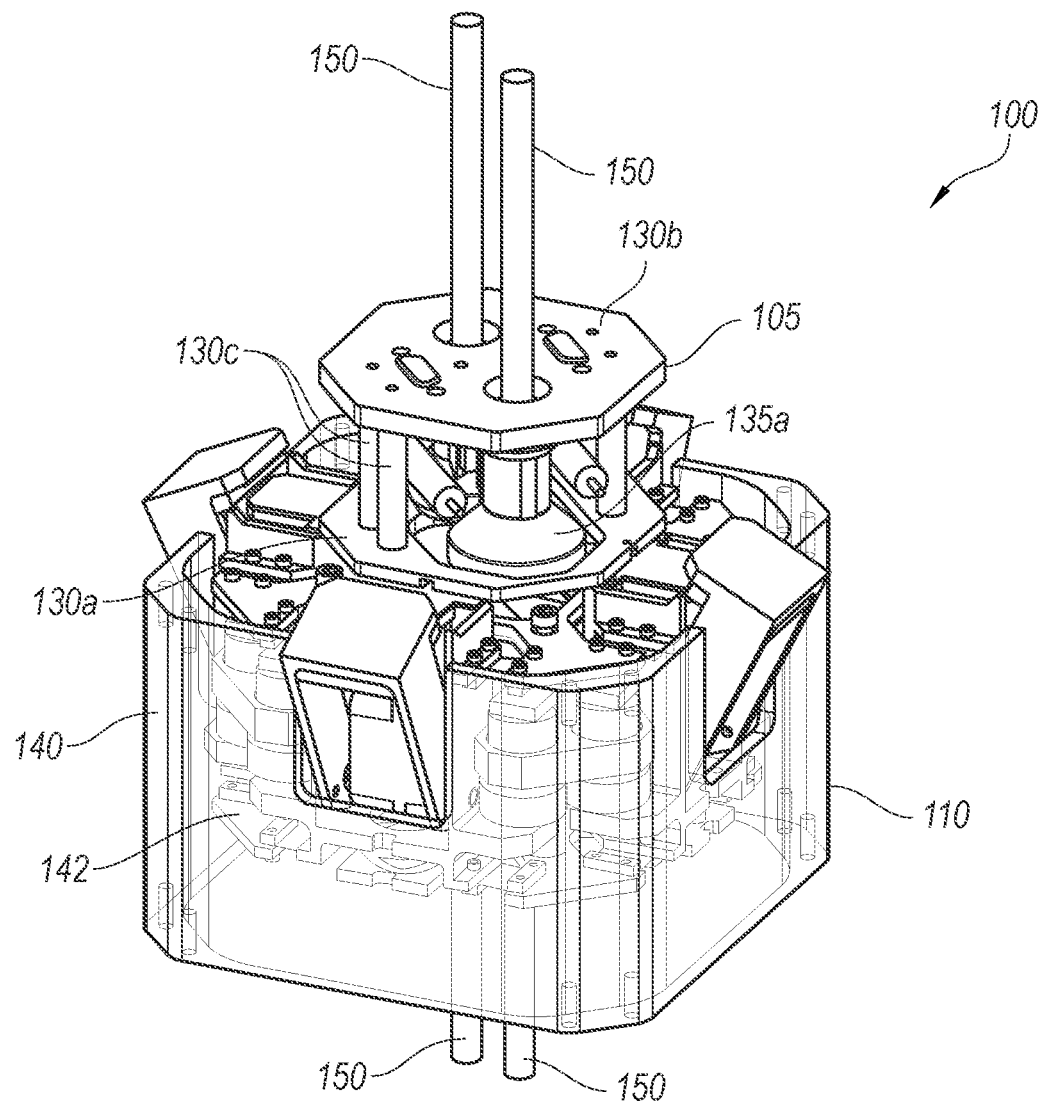
Figure 1C:
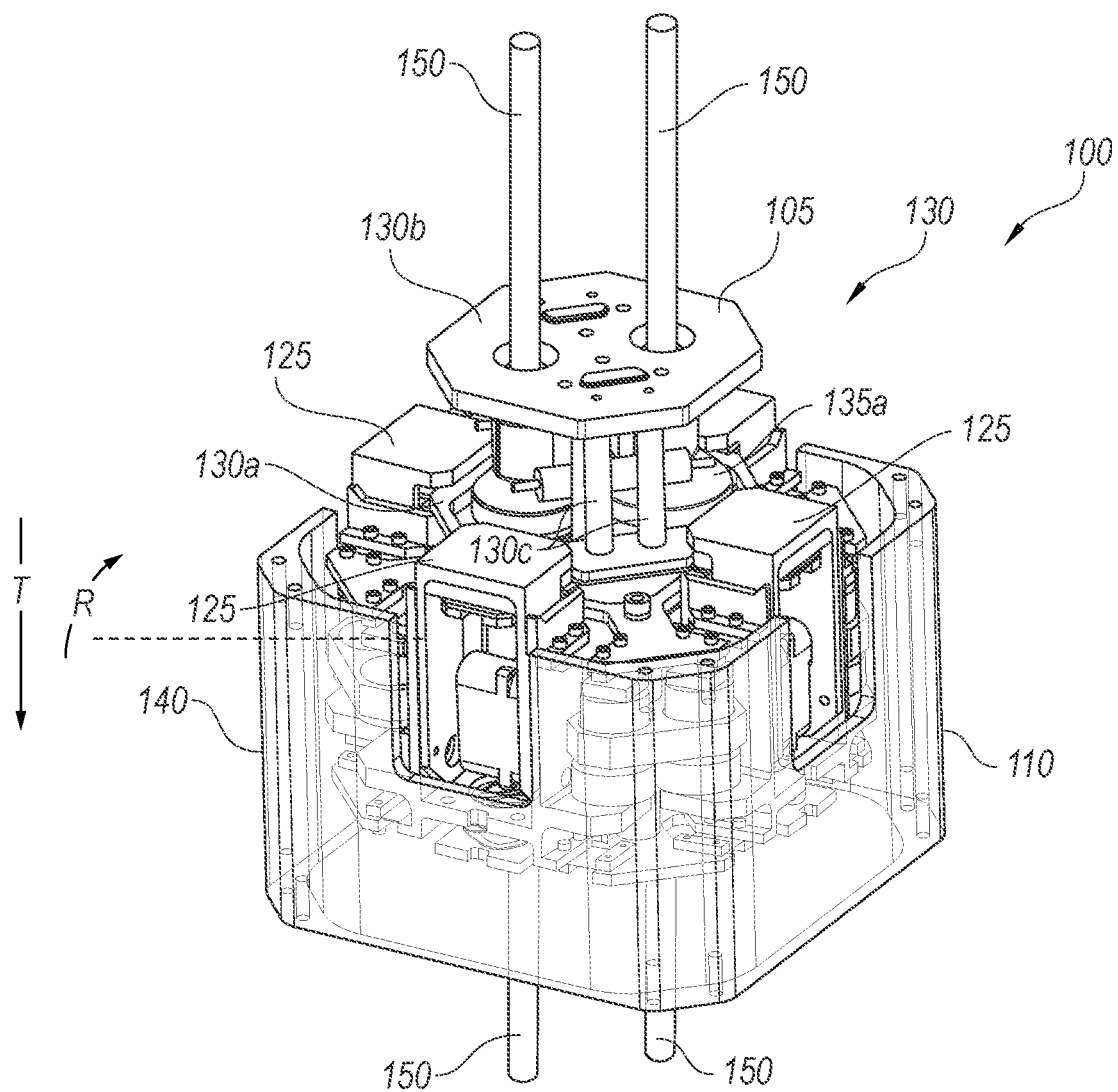

FIGS. 1A-1C illustrate partially schematic perspective views of components of a material transfer interface system 100. The system 100 can include a service valve portion 105 and a space coupling portion 110. The service valve portion 105 can be positioned on a first spacecraft (for example, replacing an existing fill/drain valve). The space coupling portion 110 can be implemented on a second spacecraft and configured to receive the service valve portion 105 to transfer materials between spacecraft or other objects, or to function as a structural docking interface. For example, in some embodiments, the space coupling portion 110 and/or the service valve portion 105 can exclude material transfer equipment (such as ports), or the portions 105, 110 can be implemented such that their material transfer equipment is not used, such that some embodiments of the present technology can be used exclusively for structural docking and/or forming a data connection. Although the space coupling portion 110 is referred to herein as a space coupling portion because it can be implemented on spacecraft, in some embodiments, the space coupling portion 110 can be used on other vehicles or containers.

FIGS. 1A-1C together show the service valve portion 105 and the space coupling portion 110 coupling with each other or decoupling from each other, in accordance with embodiments of the present technology. Coupling is generally represented in the sequence of FIG. 1A, then FIG. 1B, then FIG. 1C. Decoupling is generally represented in the reverse order (FIG. 1C, then FIG. 1B, then FIG. 1A).

With reference to FIG. 1A, the service valve portion 105 and the space coupling portion 110 approach each other along an axis Z. The relative positioning of the service valve portion 105 and the space coupling portion 110 can be controlled by an operator or a computer. For example, the service valve portion 105 and/or the space coupling portion 110 can be positioned on a movable arm or movable spacecraft to align the service valve portion 105 and the space coupling portion 110 and bring them together (as in FIGS. 1B and 1C).

In some embodiments, the space coupling portion 110 can include one or more sensors 115 (shown schematically) positioned on a face of the space coupling portion 110 to detect proximity to, and/or contact with, with the service valve portion 105. The sensors 115 can include capacitive touch sensors, proximity sensors, limit switches, optical sensors, or other sensors suitable for detecting contact and/or proximity between the service valve portion 105 and the space coupling portion 110. When the sensors 115 detect contact or sufficient proximity between the service valve portion 105 and the space coupling portion 110, a controller 120 (shown schematically) operatively connected to the sensors 115 can receive a signal output from the sensors 115 and initiate latching movement of one or more (such as four) latch arms 125. The latch arms 125 move (e.g., pivot or rotate) between a first position in which the latch arms 125 are moved outwardly (FIGS. 1A and 1B) and a second position in which the latch arms 125 are moved inwardly (FIG. 1C) to capture the service valve portion 105. The coupling mechanism is described in additional detail below.

The service valve portion 105 includes a support structure 130 (which can be in the form of a frame or other suitable supporting structure), which can support one or more ports 135a, 135b. Similarly, the space coupling portion 110 includes a support structure (described below) surrounded by an optional housing 140 and can support one or more ports 145a, 145b. For example, the service valve portion 105 can include a propellant port 135a configured to mate with and provide propellant to (or receive propellant from) a corresponding propellant port 145a on the space coupling portion 110. The service valve portion 105 can include a purge port 135b configured to mate with and receive purged materials from (or provide purged materials to) a corresponding purge port 145b on the space coupling portion 110. In some embodiments, the support structure 130 can include a first plate 130a, a second plate 130b, and one or more linking elements 130c (such as struts or pillars) to connect the first and second plates 130a, 130b together.

With reference to FIGS. 1A-1C, in some embodiments, the latch arms 125 capture the first plate 130a during the latching movement. In some embodiments, each of the service valve portion 105 and the space coupling portion 110 can include one or more data and/or power connectors 136 configured to connect with each other to transfer data and/or power between the service valve portion 105 and the space coupling portion 110 and/or between the spacecraft carrying the service valve portion 105 and the space coupling portion 110. In some embodiments, data connectors can include pin connectors, optical communication connectors, and/or other connectors suitable for cross-spacecraft communications. Power connectors can include pin connectors, plugs, sockets, and/or other connectors suitable for transferring power between spacecraft. In some embodiments, the connectors 136 can carry both data and power.

With specific reference to FIG. 1B, the service valve portion 105 has made contact with the space coupling portion 110. FIG. 1B also shows the optional housing 140 around a support structure 142 of the space coupling portion 110. The support structure 142 can be in the form of a frame structure, or it can include other suitable structural forms. At this point, the sensors 115 have detected contact or proximity between the service valve portion 105 and the space coupling portion 110. Corresponding ports 135, 145 on each of the service valve portion 105 and the space coupling portion 110 are engaged or nearly engaged with each other.

With reference to FIG. 1C (which also shows the optional housing 140 around the support structure 142 of the space coupling portion 110), the service valve portion 105 is latched or coupled to the space coupling portion 110. As described in additional detail below, the latch arms 125 have first been rotated inwardly along a direction R toward the service valve portion 105 to overlap with a portion of the support structure 130 (such as the first plate 130a) to create a "soft capture" in which the service valve portion 105 is generally prevented from moving away from the space coupling portion 110. In FIG. 1C, the latch arms 125 have also been translated along a direction T to press the latch arms 125 against the support structure 130 in order to take up play between the service valve portion 105 and the space coupling portion 110 to ensure a sufficiently rigid connection, which can be referred to as a "hard latch."

Accordingly, a coupling mechanism in a material transfer interface configured in accordance with embodiments of the present technology provides a soft capture, followed by a hard latch, using the latch arms 125. The soft capture aspect of coupling mechanisms configured in accordance with embodiments of the present technology assists with aligning the service valve portion 105 with the space coupling portion 110 to ensure engagement between the corresponding ports 135, 145 carried by the service valve portion 105 and the space coupling portion 110. For example, the symmetric nature of the latch arms 125 guide the service valve portion 105 into alignment with the space coupling portion 110 in the soft capture maneuver (rotation of the latch arms 125 along direction R) before the hard latch (translation of the latch arms 125 along the direction T) provides high clamping force that resists relative movement between the service valve portion 105 and the space coupling portion 110 (for example, movement caused by relative motion of corresponding satellite bodies) and facilitates high pressure fluid connections at the ports 135, 145. In some embodiments, for example, the clamping force provided by the latch arms 125 accommodates material flow between the connected ports 135, 145 at pressures between 10 psi and 3000 psi or more. One or more conduits 150 connect to the ports 135, 145 to carry materials (such as fluids or gases) from corresponding containers to the ports 135, 145.

Figure 2:
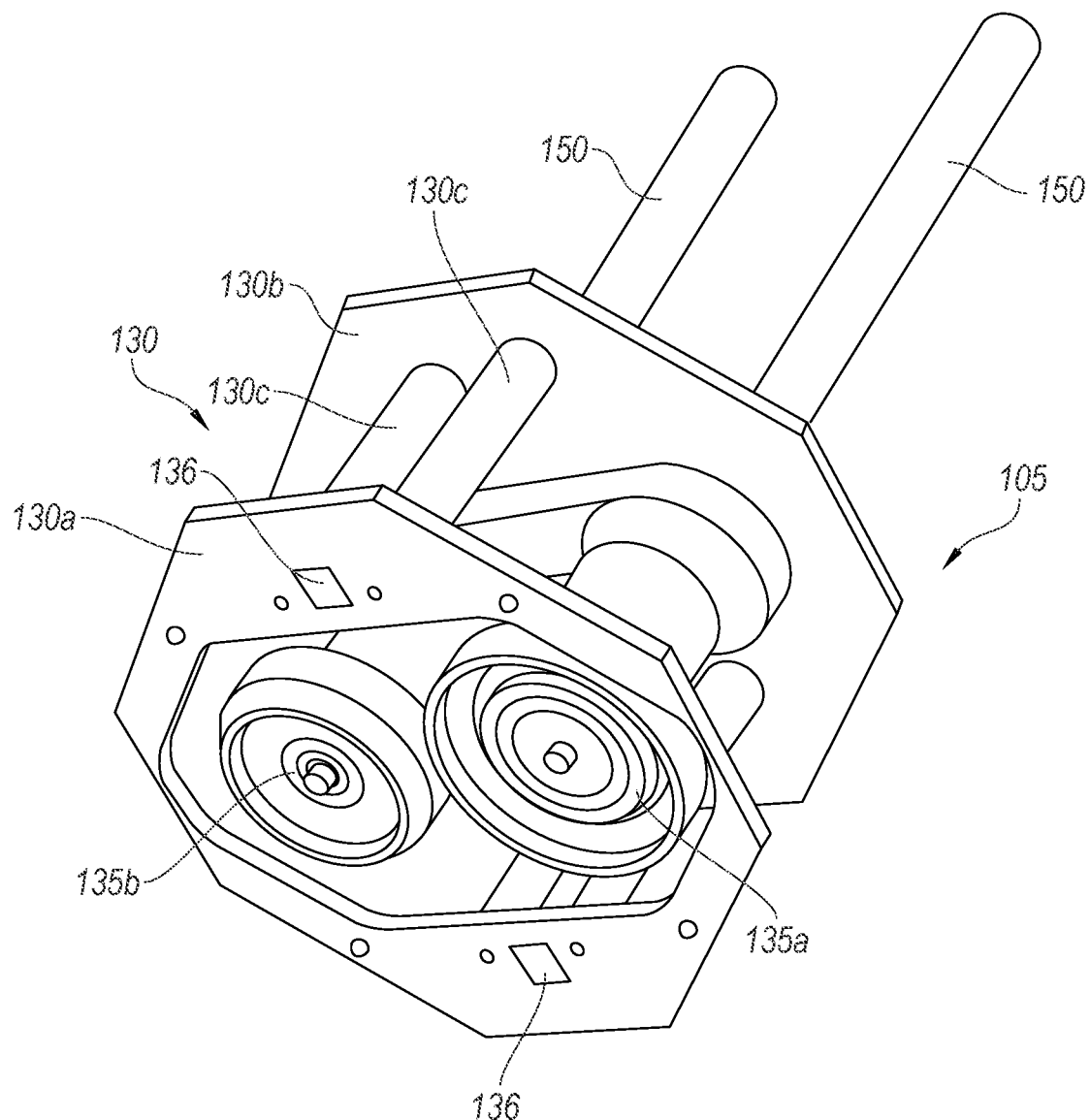
FIG. 2 illustrates a perspective view of the service valve portion shown in FIGS. 1A-1C, showing ports of the service valve portion.

FIG. 2 illustrates a perspective view of the service valve portion 105 shown in FIGS. 1A-1C. The ports 135, 145 can be configured in manners suitable for face-on connections that facilitate material transfer upon connection. Representative embodiments of suitable ports are described in additional detail below.

B. Connecting the Service Valve Portion and the Space Coupling Portion

Figure 3A:
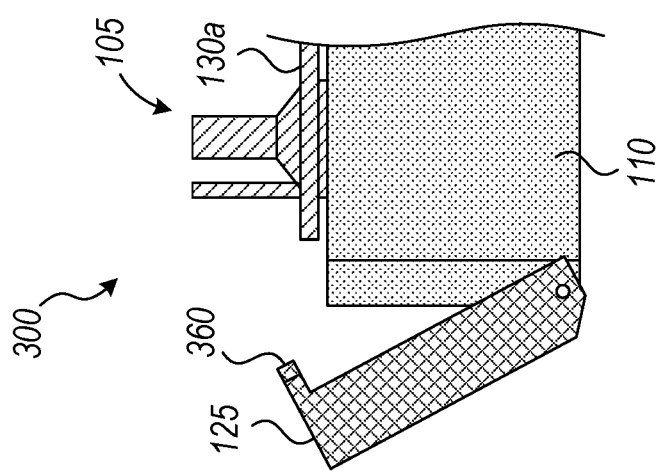
FIGS. 3A-3C together illustrate schematic views of a coupling mechanism configured in accordance with embodiments of the present technology, carrying out a coupling or decoupling sequence.
Figure 3B:
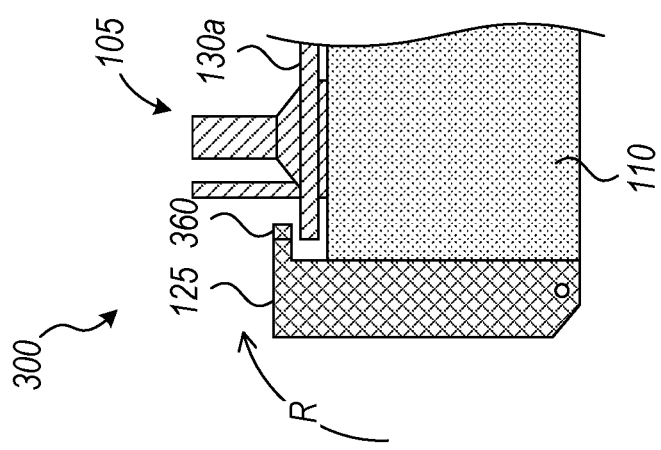
Figure 3C:
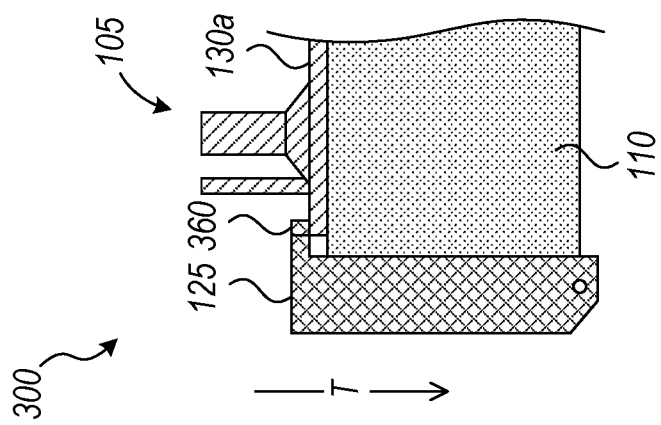

FIGS. 3A-3C together illustrate schematic views of a coupling mechanism 300 configured in accordance with embodiments of the present technology, carrying out a coupling or decoupling sequence. Coupling is generally represented in the sequence of FIG. 3A, then FIG. 3B, then FIG. 3C. Decoupling is generally represented in the reverse. In FIG. 3A, the first plate 130a has approached the space coupling portion 110 with a latch arm 125 open. In FIG. 3B, in response to a signal from the contact or proximity sensors 115 (see FIG. 1), an actuator (such as a solenoid, a stepper motor, a servo motor, or another actuator) rotates the latch arm 125 along direction R to soft capture the first plate 130a of the service valve portion 105. FIG. 3B illustrates that the service valve portion 105 may not be fully engaged with the space coupling portion 110 but it is unable to be moved entirely away from the space coupling portion 110 due to the soft capture by the latch arm 125 (e.g., due to the position of a lip 360 carried by the latch arm 125, the lip 360 extending from the latch arm 125 and positioned to overlap the first plate 130a when the latch arm 125 is rotated inwardly along direction R). FIG. 3C illustrates that the latch arm 125 has translated along direction T to hard latch the first plate 130a to the space coupling portion 110. Translation along direction T can be facilitated with a wax motor or linear actuator connecting the latch arm 125 to the space coupling portion 110.

Figure 4A:
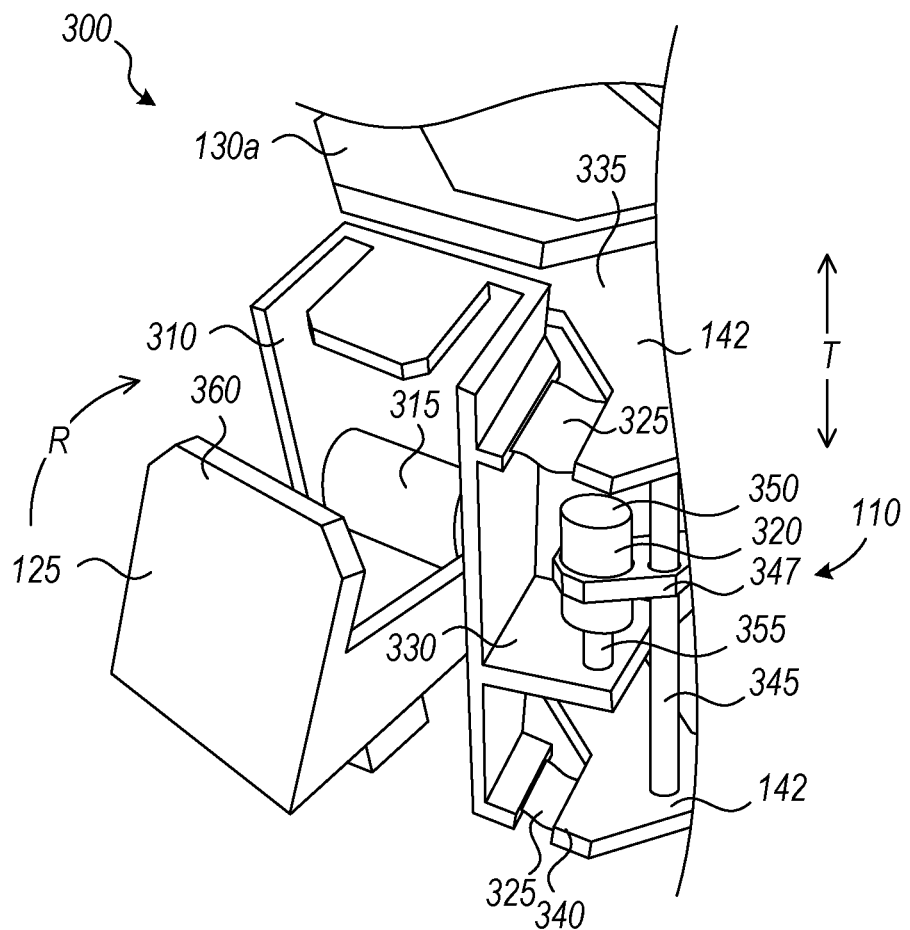
FIG. 4A illustrates a partially schematic view of the coupling mechanism shown in FIGS. 3A-3C, configured in accordance with embodiments of the present technology, further showing actuators to facilitate the coupling action.

FIG. 4A illustrates a partially schematic view of the coupling mechanism 300 configured in accordance with embodiments of the present technology, further showing actuators that carry out the coupling action. In some embodiments, the latch arms 125 are movably (e.g., pivotably or rotatably) connected to a latch-arm base 310 to rotate along the direction R to provide the soft capture aspect of the mechanism 300. In some embodiments, a latch-arm actuator 315 (such as a solenoid, a stepper motor, a servo motor, or another actuator) is attached to each latch arm 125 and latch-arm base 310 to cause the latch arm 125 to rotate along the direction R to provide the soft capture function between the space coupling portion 110 and the service valve portion 105. In some embodiments, each latch-arm base 310 carries a single latch arm 125. In other embodiments, each latch-arm base 310 carries two or more latch arms 125 (for example, the multiple latch arms 125 can be positioned similarly to one another, adjacent to one another, and operating similarly to one another). Each latch arm 125 pivots or rotates relative to a latch-arm base 310 via one or more corresponding latch-arm actuators 315 or by other sources of force. For example, embodiments can include a latch-arm actuator 315 for each latch arm 125 or a shared latch-arm actuator 315 for all of the latch arms 125 carried by one of the latch-arm bases 310.

The latch-arm base 310 (carrying the latch arms 125) moves along the direction T relative to the support structure 142 of the space coupling portion 110 via forces provided by one or more actuators 320 positioned between the latch-arm base 310 and the support structure 142 to cause the hard latch connection. In some embodiments, an actuator 320 positioned between the latch-arm base 310 and the support structure 142 can include a wax motor, a linear actuator, and/or another suitable actuator. In some embodiments, the latch-arm base 310 is connected to the support structure 142 in a movable manner via one or more flexible elements 325 (such as four flexible elements 325, which can include two near the top of the latch-arm base 310 and two near the bottom of the latch-arm base 310). In some embodiments, the latch-arm base 310 can be connected to the support structure 142 via only two flexible elements 325 (such as two near the top of the latch-arm base 310 or two near the bottom of the latch arm base 310). The flexible elements 325 can include springs or flexible strips of material that effectively suspend the latch-arm base 310 in a movable manner relative to the support structure 142. The flexible elements 325 facilitate a low-friction interface between the latch-arm base 310 and the support structure 142, which reduces (e.g., minimizes) the energy needed to move the latch-arm base 310. For example, in some embodiments, the flexible elements 325 help minimize the number of sliding surfaces.

In some embodiments, the support structure 142 includes two parallel plates 335, 340 connected by one or more struts or connecting elements 345. The support structure 142 can carry an actuator 320 that is positioned to engage (such as push) the latch-arm base 310. For example, the actuator 320 can be operatively positioned between the latch-arm base 310 and the support structure 142. In some embodiments, the actuator 320 can be positioned to push on a ledge or projection 330 extending from the latch-arm base 310. In some embodiments, the support structure 142 can include a bracket 347 for supporting the actuator 320 on the support structure 142. One or more of the connecting elements 345 can support the bracket 347 and/or another part of the support structure 142 can support the bracket 347.

One or more of the actuators 320 can include an actuating portion 350 and a piston rod 355. If the actuator 320 is a wax motor, when power is applied to the wax motor (for example, upon instruction by the CPU 120 shown in FIG. 1A, or another controller), the wax motor heats wax which expands to push the piston rod 355. The extending piston rod 355 pushes the projection 330 away from the bracket 347 (generally speaking, the extending piston rod 355 pushes the latch arm base 310 away from the upper plate 335, and downward along direction T). This movement causes the lip 360 of the latch arm 125 (which has captured the first plate 130a of the service valve portion 105, see FIG. 2) to move downward along direction T (towards the first plate 130a and the support structure 142 of the space coupling portion 110), resulting in the hard latch connection. In some embodiments, the support structure 142 can support the actuator 320 in other ways. In some embodiments, the actuator 320 can be supported on the latch-arm base 310 (for example, on the projection 330) and positioned to push on the support structure 142.

When power is removed from the wax motor, the wax in the wax motor cools, withdrawing the piston rod 355 and allowing the latch-arm base 310 to travel upwards along direction T (for example, due to the biasing force provided by the flexible elements 325) to revert to a soft capture position. The latch-arm actuator 315 can be activated to rotate the latch arm 125 away from the latch-arm base 310 to fully disengage the space coupling portion 110 from the service valve portion 105.

In some embodiments, the mechanism 300 can be configured to be in a "normally-open" configuration, such that when power is removed, the wax in the wax motors cools sufficiently to release the force between the latch-arm base 310 and the support structure 142, which allows the flexible elements 325 to bias the latch-arm base 310 upwards along the direction T towards the soft capture position. In addition, the mechanism 300 can include a spring element that biases the latch arm 125 away from the latch-arm base 310 and toward an open position. Other springs can be implemented to bias the mechanism 300 toward an open position. Such a "normally-open" configuration can be a fail-safe configuration that is advantageous to protect two spacecraft in the event one spacecraft experiences a power failure or other emergency. The healthy spacecraft can quickly and/or automatically be undocked from the failing or damaged spacecraft. Some embodiments can include a mechanical, electrical, or electromechanical system that forces the service valve portion 105 and the space coupling portion 110 apart from each other upon opening the mechanism 300. For example, one or more springs, pushers, or other separation devices can be carried on the space coupling portion 110 and/or the service valve portion 105 to push the portions 110, 105 away from each other. In some embodiments, the actuators 320 and/or springs can be configured such that the mechanism 300 has a "normally-closed" configuration.

In accordance with some embodiments of the present technology, some devices having four latch-arm bases 310 and four corresponding latch arms 125 can also include four corresponding latch-arm actuators 315 and eight corresponding wax motors (e.g., one on either side of each latch-arm base 310, generally indicated with reference numerals 320). However, in other embodiments, other quantities and combinations of arms, arm bases, actuators, and wax motors can be used. An advantage of embodiments of the present technology includes the ability for the mechanism 300 to engage in a soft capture and/or hard latch connection even in the event of failure of one or more (such as all but one) of the latch-arm bases 310 and/or latch arms 125. In some embodiments, the coupling mechanism 300 can include an actuator positioned to cause the latch arm 125 to translate relative to the latch arm base 310.

Figure 4B:
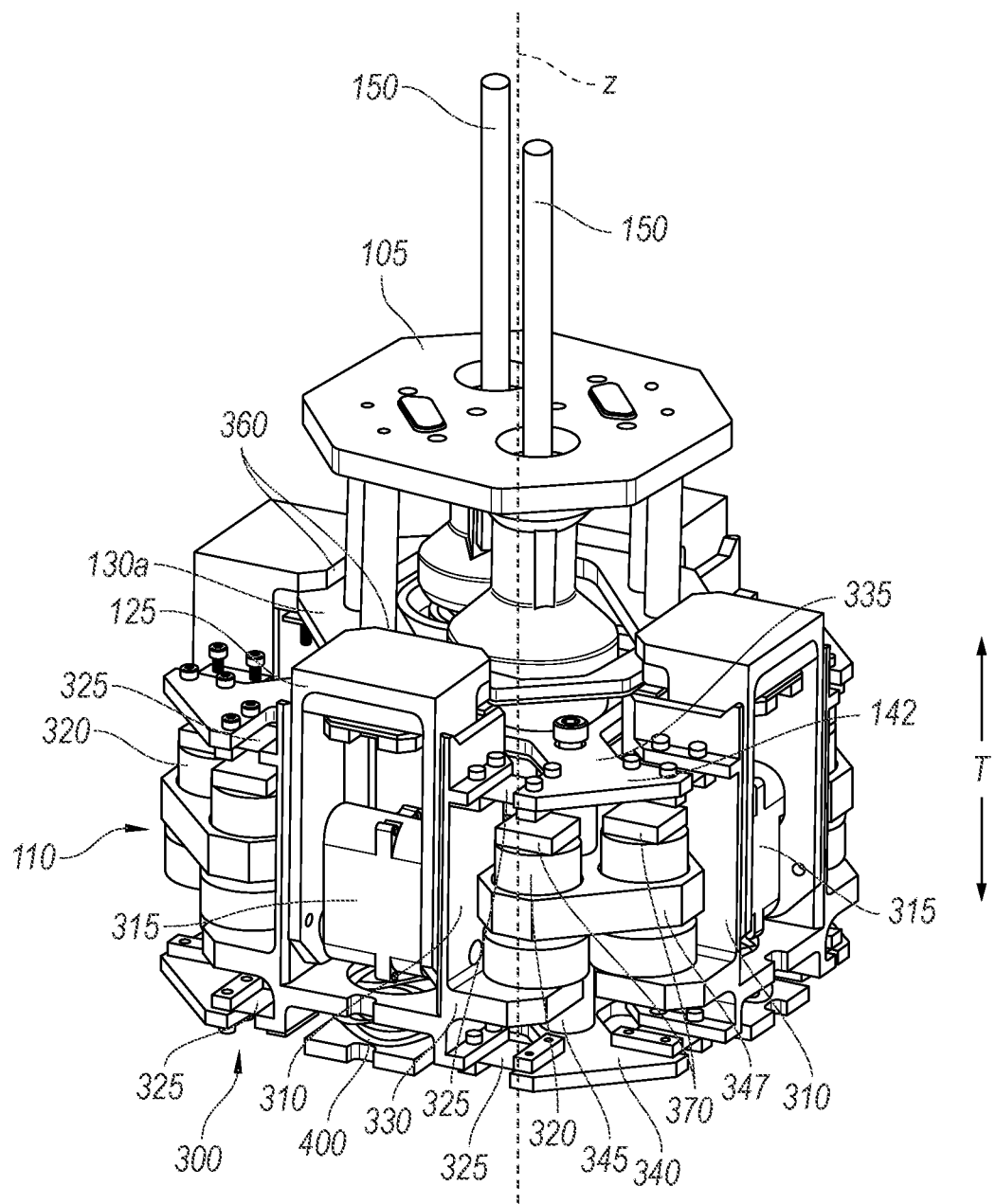
FIG. 4B illustrates a partially schematic perspective view of several components of the material transfer interface system configured in accordance with embodiments of the present technology.

FIG. 4B illustrates a partially schematic perspective view of several components of the material transfer interface system 100 configured in accordance with embodiments of the present technology. FIG. 4B is similar to FIG. 1C, except that FIG. 4B excludes the optional housing (140) shown in FIG. 1C, and FIG. 4B shows the components of the interface system 100 rotated approximately ninety degrees about the Z-axis. In FIG. 4B, as in FIG. 1C, the service valve portion 105 is hard-latched to the space coupling portion 110. In such a configuration, the ports 135, 145 (see FIG. 1A) are engaged and sealed together for transferring materials between the service valve portion 105 and the space coupling portion 110. FIG. 4B further shows a biasing spring 400 positioned to bias a latch-arm base 310 toward an open (e.g., a soft latch or fully open configuration). The biasing spring 400 can be positioned between the latch-arm base 310 and a portion of the support structure 142, such as the lower plate 340, to provide a force on the latch-arm base 310 upward along direction T. Representative heating elements 370 for the wax motors are shown in FIG. 4B.

FIGS. 4C and 4D together illustrate schematic views of a coupling mechanism 410 configured in accordance with embodiments of the present technology, carrying out a coupling or decoupling sequence. The coupling mechanism 410 is similar to the coupling mechanism 300 described above with regard to FIGS. 3A-4B. In some embodiments, the support structure 142 includes a plurality of guides 415. The latch arms 125 may engage the guides 415 to move to the closed position. For example, in some embodiments, a portion of the support structure 142 (such as the lower plate 340 or another portion of the support structure 142) includes a guide 415 in the form of an angled edge portion 416 configured to engage an angled edge portion 420 on some embodiments of the latch arm 125. As the latch arm 125 is moved downward along direction T (by force of an actuator, for example), the angled edge portions 416, 420 engage each other to cause the latch arm 125 to rotate along direction R. The guides 415 (such as the angled edge portions 416) cause movement along the direction R with or without the presence and/or assistance of an additional actuator to cause the rotation along the direction R. Accordingly, both the soft capture and hard latch engagements provided by coupling mechanisms configured in accordance with some embodiments of the present technology can be accomplished by simply moving the latch arm base 310 (see FIGS. 4A, 4B) along direction T.

In some embodiments, at least partly because of the geometry of the coupling mechanism 410, a latch-arm actuator 315 (see FIGS. 4A, 4B) can be omitted. In some embodiments, the latch-arm actuator 315 need not be powered on or engaged to keep the latch arm 125 in its soft-capture position. In some embodiments, the coupling mechanism 410 can maintain a hard latch in the event of failure of a latch-arm actuator 315 (see FIGS. 4A, 4B).

Figure 5:
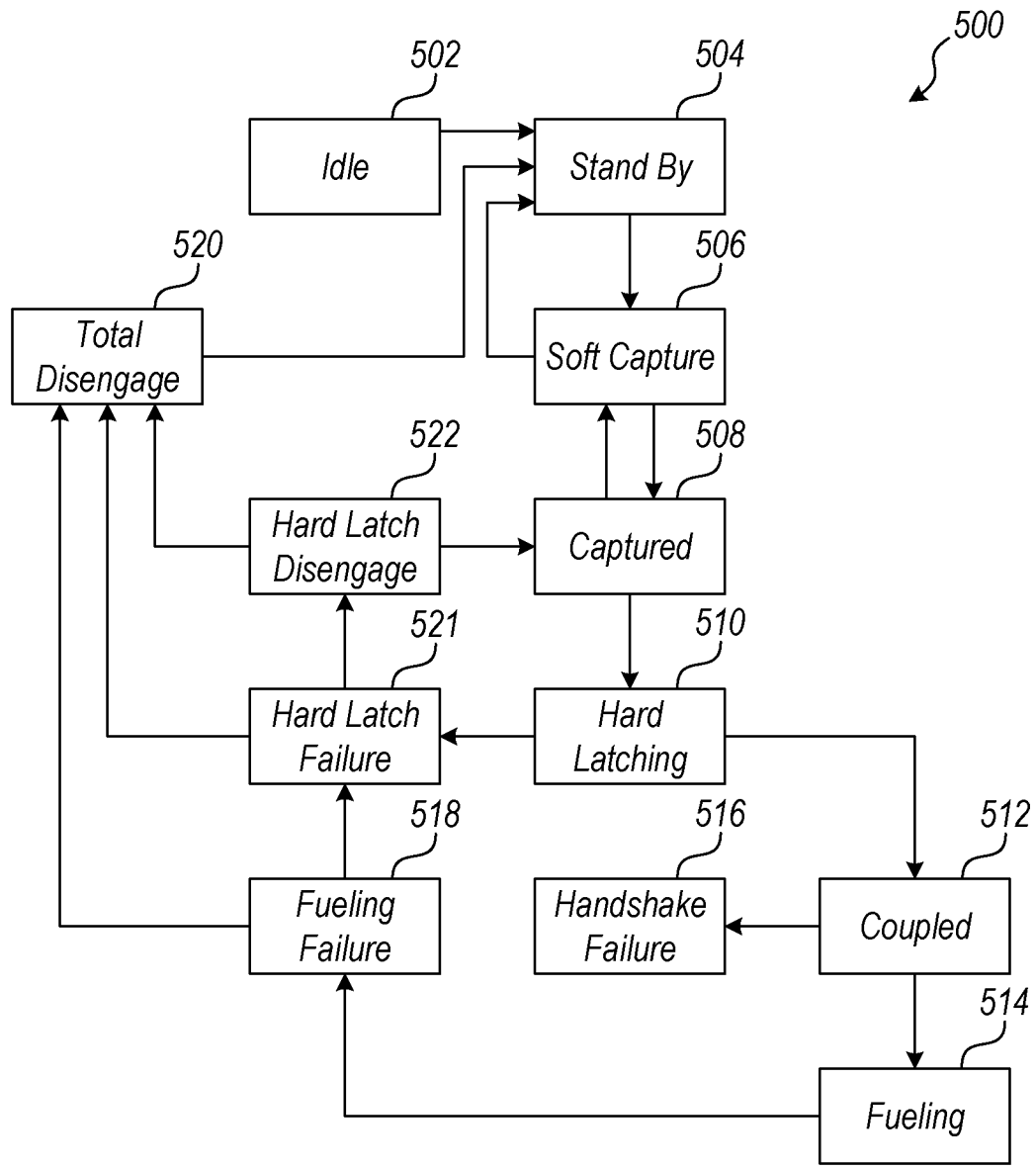
FIG. 5 is a flow diagram illustrating a coupling and/or fueling process according to embodiments of the present technology.

FIG. 5 is a flow diagram illustrating a coupling and/or fueling process 500 in accordance with embodiments of the present technology. In some embodiments, the process 500 can be performed under the control of one or more controllers programmed with instructions to carry out one or more (e.g., all) steps of the process 500.

Beginning at block 502, a material transfer interface can be in an idle and/or waiting state, in which the service valve portion 105 and the space coupling portion 110 are disconnected from each other and spaced apart from each other. In some embodiments, upon the service valve portion 105 and the space coupling portion 110 approaching one another, a controller or operator may place the components of the interface system 100 in a standby state (block 504). If the system or an operator detects contact (or in some embodiments, near contact) between the service valve portion 105 and the space coupling portion 110 (e.g., with one or more sensors 115, described above), the interface system 100 performs a soft capture maneuver (block 506) by rotating the latch arms 125 toward the latch-arm bases 310 (as described above) to generally restrain the service valve portion 105 from moving away from the space coupling portion 110 (i.e., limit the extent to which the service valve portion 105 can move from the space coupling portion 110). If the system or an operator does not detect contact (or near contact) between the service valve portion 105 and the space coupling portion 110, or if the contact is deemed insufficient for soft capture (for example, if the service valve portion 105 and the space coupling portion 110 are not sufficiently aligned to facilitate a sealed connection between corresponding ports), the interface system 100 can time out and revert to a standby state in block 504.

After the soft capture maneuver (block 506), the interface system 100 or an operator verifies whether the interface system 100 is in a state of soft capture (block 508) and ready for hard latching. For example, if contact and/or alignment is insufficient or soft capture fails, the interface system 100 can retry the soft capture maneuver (block 506) or controllers or other operators may further align the components to improve contact before performing a hard latching maneuver (block 510).

After the interface system 100 is deemed to be in a state of soft capture (block 508), then in block 510, the interface system 100 hard latches, as explained above (for example, the latch-arm bases 310 move along direction T, see FIGS. 1C, 3C, 4A, 4B).

If hard latching (block 510) is successful, then in some embodiments, the interface system 100 can be considered coupled or docked (block 512). In some embodiments, in order for the controller to deem the system coupled or docked, proper contact and alignment must exist for an amount of time, such as ten seconds. In addition, in some embodiments, coupling also produces telemetry or other data continuity between the service valve portion 105 and the space coupling portion 110 (for example, via the data connectors 136, see FIGS. 1A, 2) for an amount of time (such as ten seconds) before a controller deems the interface system 100 to be in a coupled or docked state. If docking is considered successful (block 512), then in block 514, the controller can initiate fueling or other material transfer through the interface system 100 (for example, using the ports described above).

In some embodiments, if a controller detects a failure, the controller can initiate one or more failure modes and, optionally, a reversion to an earlier state in the process 500. For example, in some embodiments, if telemetry or other data are not sufficiently exchanged between the service valve portion 105 and the space coupling portion 110, in block 516, a controller can initiate a handshake failure protocol, which can include reverting to any earlier state to try again. In some embodiments, in block 518, the controller can indicate a fueling failure (for example, if sensors associated with the interface system 100 fail to detect successful transfer of materials and/or failure of the ports). In response to the fueling failure, in block 520, the controller can cause the interface system 100 to be totally disengaged followed by reverting to a standby state in block 504 (for example, to try again later).

In some embodiments, the controller analyzes the force applied by the coupling mechanism 300 to hold the service valve portion 105 to the space coupling portion 110 (e.g., using one or more strain gauges). If the force is insufficient, the controller can indicate a hard latch failure in block 521, followed by the controller initiating a hard latch disengage (i.e., release of the wax motors) in block 522, to revert to a soft capture state in block 508, or to another part of the process 500, to re-attempt coupling and material transfer. In some embodiments, after a hard latch disengage in block 522, the controller can totally disengage the interface system 100 in block 520 (for example, if the controller determines that an aspect of the process 500 is not possible with the current state and/or relative positions of the service valve portion 105 and the space coupling portion 110).

Some systems configured in accordance with embodiments of the present technology include aliveness sensors that output a signal indicating a power state of at least one of the connected spacecraft (e.g., a signal representative of whether the spacecraft is powered on or powered off, or whether the spacecraft is experiencing a failure). In some embodiments, if at any time an aliveness sensor indicates that one of the connected spacecraft is powered off or has experienced a loss of power or other failure, the coupling mechanism responds by stopping the coupling process or releasing the connection (although in some embodiments it can maintaining the connection).

Generally, coupling mechanisms configured in accordance with embodiments of the present technology include latch arms positioned to move between an open position and a closed position. In the closed position, the coupling portion has captured another object, such as the service valve portion. Additional embodiments of coupling mechanisms are described below.

C. Ground Coupling Portion

Figure 6A:
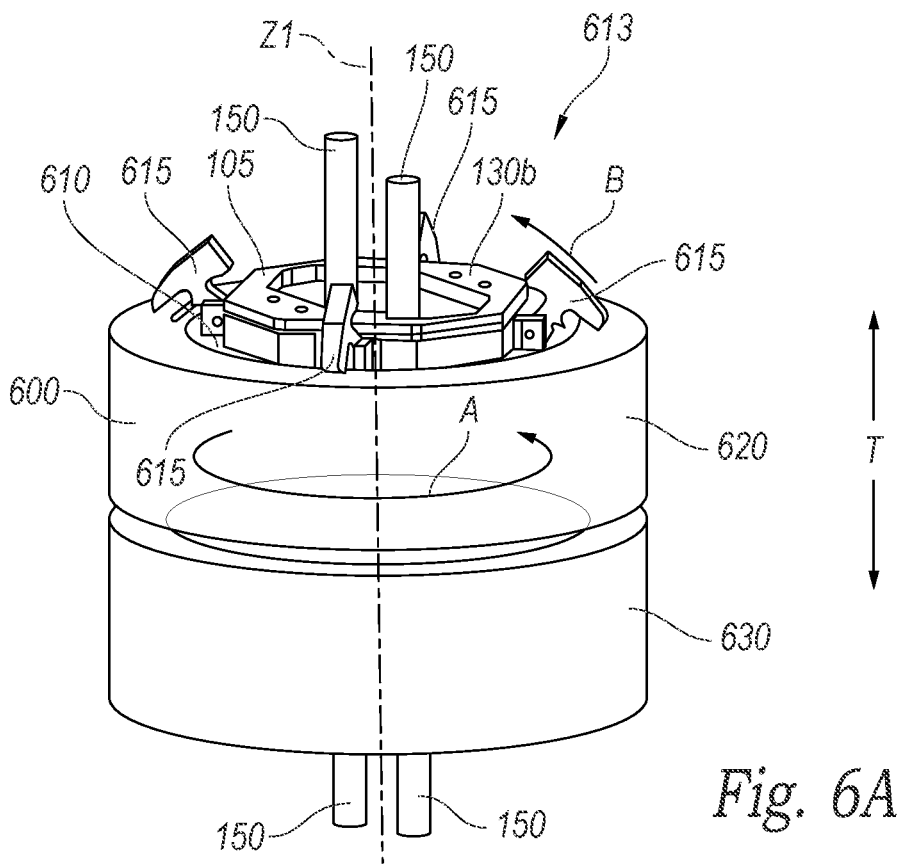
FIGS. 6A and 6B illustrate partially schematic perspective views of the service valve portion engaged with a ground coupling portion configured in accordance with embodiments of the present technology.
Figure 6B:
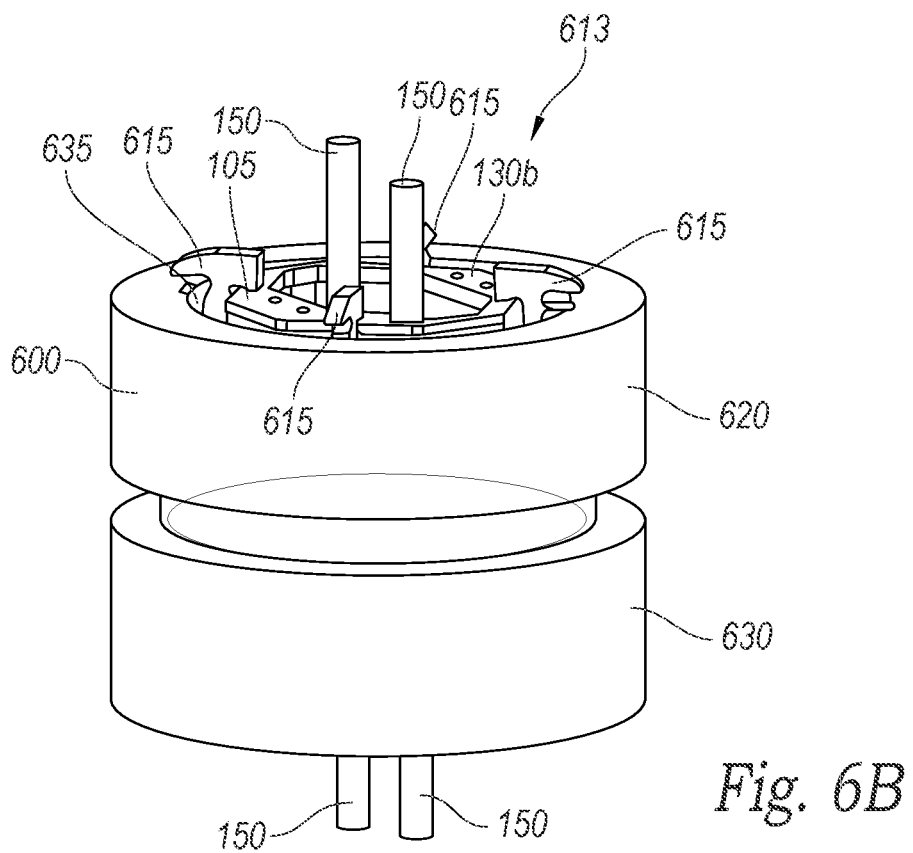

FIGS. 6A and 6B illustrate partially schematic perspective views of a service valve portion 105 engaged with a ground coupling portion 600 configured in accordance with embodiments of the present technology. The ground coupling portion 600 can be implemented on a ground-based system and configured to mate with the service valve portion 105, for example, to service a spacecraft on the ground (e.g., to transfer materials to and/or from the spacecraft). The ground coupling portion 600 receives the service valve portion 105 to connect the ports 135a, 135b of the service valve portion 105 (see FIG. 2) to corresponding ports of the ground coupling portion 600 to transfer materials between two containers.

Referring to FIG. 6A, in some embodiments, the ground coupling portion 600 receives the service valve portion 105 in a cavity 610 and holds the service valve portion 105 with a coupling mechanism 613. The mechanism 613 of the ground coupling portion 600 includes one or more (such as four) hook- or hammer-shaped latch arms 615 which are spring-biased toward an open position (radially away from the center of the ground coupling portion 600).

A proximal portion 620 of the ground coupling portion 600 is rotatable relative to a distal portion 630. The proximal portion 620 is connected to the distal portion 630 by a threaded engagement that causes the proximal portion 620 to move up and down along axis Z1 relative to the distal portion 630. Upon rotation of the proximal portion 620 relative to the distal portion 630, as generally indicated by arrow A, the proximal portion 620 translates upward along direction T to push the latch arms 615, causing them to pivot about a pivot point (for example, along a direction generally indicated by arrow B), and close the latch arms 615 around the service valve portion 105 (for example, around the top plate 130b) to secure the service valve portion 105 to the ground coupling portion 600. In some embodiments, the movement of the proximal portion 620 relative to the distal portion 630 can also apply a downward force on the latch arms 615 to further secure the service valve portion 105 to the ground coupling portion 600. FIG. 6B shows the service valve portion 105 secured in the ground coupling portion 600, with the latch arms 615 rotated into a position to secure the top plate 130b. In some embodiments, the ground coupling portion 600 can implement a Higbee type connection between the proximal portion 620 and the distal portion 630. In some embodiments, a resilient tab element 635 can be positioned between each of the latch arms 615 and the proximal portion 620 to improve alignment and consistency in torque.

The ground coupling portion can be autonomously operated or it can be fully or partially manually operated. In a particular representative embodiment, the ground coupling portion can be fully manually operated for facilitating fueling of a spacecraft or otherwise transferring materials on the ground as opposed to in space. In some embodiments, the ground coupling portion 600 can be implemented in a spacecraft and operated in space.

D. Self-Aligning Ports

Aspects of the present technology include self-aligning ports that can be implemented as one or more of the ports 135a, 135b, 145a, 145b described above with regard to FIG. 1A. For example, when the ports 135a, 135b engage their counterparts 145a, 145b, the port geometry can self-align the ports and seal their connection for material transfer. With reference to FIG. 1A, in some embodiments, the service valve portion 105 can carry a male port 135a and a female port 135b. The space coupling portion 110 can carry a corresponding female port 145a and a male port 145b. When the service valve portion 105 engages the space coupling portion 110, the male port 135a carried by the service valve portion 105 mates with the female port 145a carried by the space coupling portion 110, and the female port 135b carried by the service valve portion 105 mates with the male port 145b carried by the space coupling portion 110. Although the arrangement illustrated in FIG. 1A includes a male and female port pair together engaging another corresponding male and female port pair, in further embodiments, other configurations can be implemented. For example, the service valve portion 105 can have any suitable number of ports (for example, one or more), and the space coupling portion 110 can have a corresponding number of corresponding ports. Some or all of the ports on the service valve portion 105 can be male ports and some or all of the ports on the space coupling portion 110 can be female ports, or vice versa.

FIG. 7A illustrates a perspective view of a port 700 configured in accordance with an embodiment of the present technology. The port 700 can be implemented as one or more of the ports 135a, 135b, 145a, 145b described above with regard to FIG. 1A, and/or the port 700 can be implemented in systems other than the space coupling portion 110, the service valve portion 105, and the ground coupling portion 600. For example, the port 700 can be implemented in any system and/or mechanism that involves transferring materials.

The port 700 includes a port body 710 and a port head 720. The port body 710 is connectable to a conduit for passing materials into and out of the port 700 (such as a conduit 150 shown in FIG. 1A and described above). For example, the port body 710 can include and/or be attached to a connector element 730 for engaging a conduit to facilitate flow of material between the conduit and the port 700. Further embodiments can include other connectors suitable for connecting a conduit. The port head 720 includes a port face 740 and an optional flange 750. In some embodiments, the flange 750 includes mounting holes 760 for mounting the port 700 to a supporting structure. In further embodiments, the port 700 can include other devices for mounting the port 700 to a supporting structure. In some embodiments, the flange 750 can be omitted. The port face 740 can include a contoured engagement surface configured to mate with a corresponding contoured engagement surface on another port (e.g., the port described below with regard to FIG. 7B). In some embodiments, the port face 740 includes a female or cup portion 770 configured to receive a male portion, such as a cone or other protrusion carried by another port (e.g., the port described below with regard to FIG. 7B). The port face 740 can include one or more grooves 780 for carrying an O-ring 785. As explained in additional detail below, the port face 740 seals against a corresponding port face on another port. In further embodiments, the port face 740 can seal against another face-sealing mechanism. The port 700 also includes a movable pintle 787, which can extend out of the port face 740 through an opening in the port face 740 to engage a corresponding movable pintle on another port, as described in additional detail below.

FIG. 7B illustrates a perspective view of a port 790 configured in accordance with another embodiment of the present technology. The port 790 is similar to the port 700 described above with regard to FIG. 7A, except that a port head 791 includes a port face 792 having a different contoured engagement surface that is configured to mate with the corresponding contoured engagement surface on another port, such as the port 700 described above with regard to FIG. 7A. The port head 791 (which includes the port face 792) can include an optional flange 793 that has a different shape than the optional flange 750 described above with regard to FIG. 7A. The port face 792 can include a male portion, such as a cone 794 configured to engage into the cup portion 770 of the port 700 described above with regard to FIG. 7A. The port face 792 can also include one or more (such as two) grooves 780 for carrying O-rings 785. The port face 792 seals against the corresponding port face 740 described above with regard to FIG. 7B. The port 790 also includes a pintle 787, which can extend out of the port face 792 to engage the pintle on another port, such as in the port 700 described above with regard to FIG. 7A.

Although FIG. 7A illustrates a generally circular flange 750 and FIG. 7B illustrates a generally triangular flange 793, ports configured in accordance with embodiments of the present technology include flanges having other shapes, or they can omit flanges.

Figure 8:
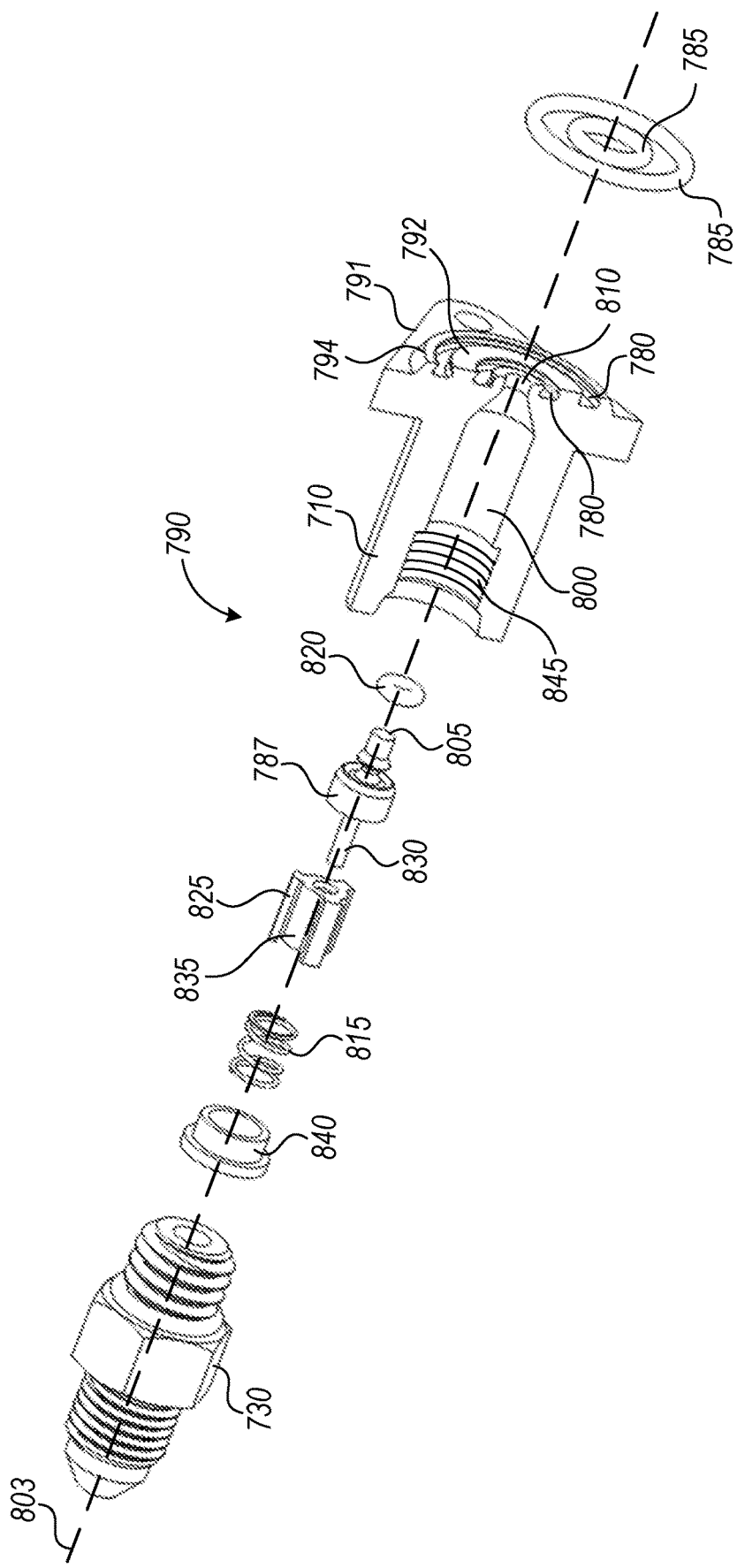
FIG. 8 illustrates a perspective exploded view of the port shown in FIG. 7B.

FIG. 8 illustrates a perspective exploded view of the port 790 shown in FIG. 7B. FIG. 8 also shows the port body 710 in a cross-sectional view. The pintle 787 is movable within a bore 800 in the port body 710 along a longitudinal axis 803. The pintle 787 includes a pintle tip 805 that optionally protrudes from the port face 792 before the port 790 engages another port (i.e., a port-closed position, as seen in FIG. 7B). The pintle tip 805 can be pressed into the port body 710 when the port 790 engages another port, as explained in additional detail below with regard to FIGS. 9 and 10. The pintle tip 805 can have a slightly smaller diameter than the diameter of an opening 810 in the port face 792 through which the pintle tip 805 moves. The pintle 787 is biased toward the port-closed position with a resilient element such as a spring 815. In some embodiments, the port 790 includes an O-ring 820 positioned on the pintle 787 to seal the pintle 787 against the interior of the port body 710 to seal the port 790 when the pintle 787 is in the port-closed position.

In some embodiments, additional components can be positioned within the port body 710 to assist movement of the pintle 787. For example, in some embodiments, the port 790 includes a bore rider 825 that moves within the bore 800 along the longitudinal axis 803 with the pintle 787. The pintle 787 can include a pintle shaft 830 that is positioned within the bore rider 825. The pintle 787 can be formed as an integral assembly in some embodiments, or in other embodiments, it can include multiple components joined together. In some embodiments, the pintle 787 is integral with the bore rider 825. The bore rider 825 can have a generally cylindrical shape and a size corresponding to the size of the bore 800 so that the bore rider 825 is movable within the bore 800 and remains coaxial with the bore 800. The bore rider 825 can keep the pintle 787 coaxial with the bore 800. The bore rider 825 can include one or more slots 835 oriented along the longitudinal axis 803 for allowing material to pass by the bore rider 825. In some embodiments, the bore rider 825 includes a lubricious material such as polytetrafluoroethylene (PTFE) to reduce friction within the bore 800. The spring 815 can be positioned between the bore rider 825 and the connector element 730. In some embodiments, a spring retainer 840 can be included to maintain the spring 815 in coaxial alignment with the other components of the port 790. The connector element 730 can include threads that engage corresponding optional threads 845 in the bore 800. The connector element 730 covers the bore 800 and keeps the components of the port 790 in the bore 800. In some embodiments, the connector element 730 can be welded to the port body 710. In some embodiments, the connector element 730 can be snapped or pressed into the bore 800. Although a threaded connector element 730 is illustrated and described, other embodiments can include any suitable connector to connect a conduit and/or to hold components of the port 790 in the port body 710.

As explained above, the port 790 shown in FIG. 7B and FIG. 8 is similar to the port 700 shown in FIG. 7A, with the exception of the configuration of the port heads 720, 791, so the foregoing description of the port 790 also describes the port 700 shown in FIG. 7A, which can include the same or similar internal components as the port 790 in FIG. 7B and FIG. 8.

Figure 9:
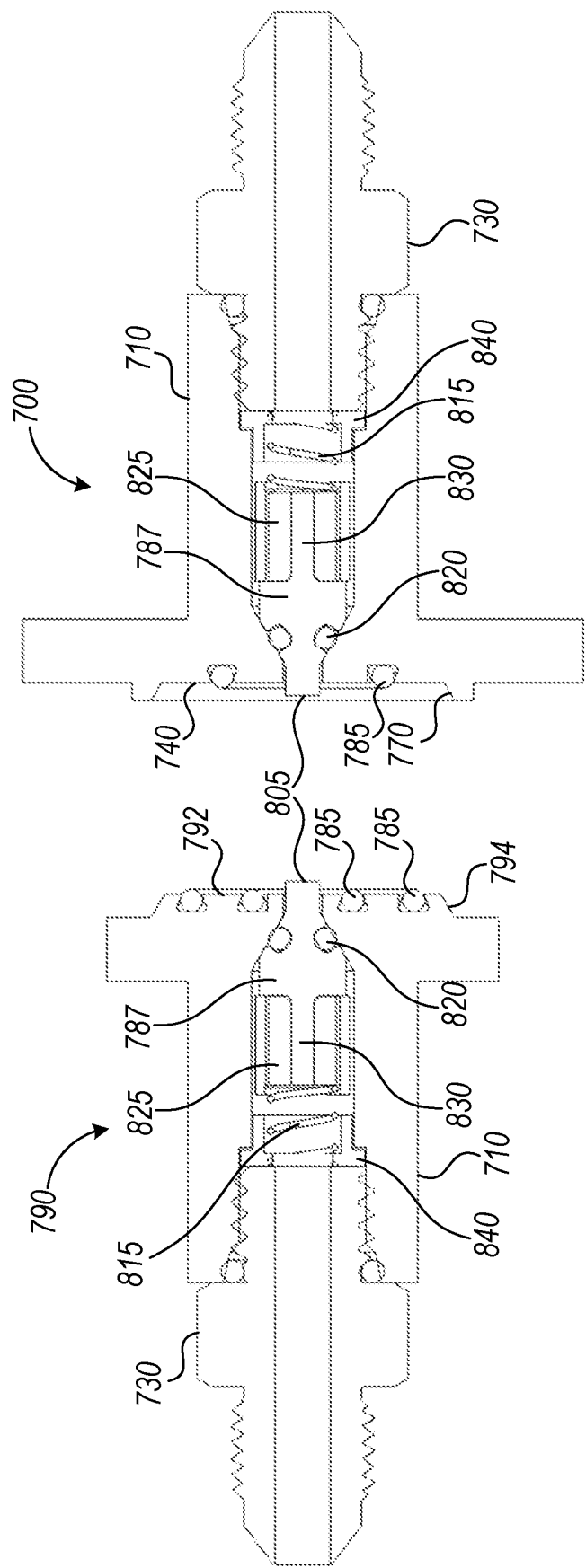
FIG. 9 illustrates a cross-sectional view of the ports shown in FIGS. 7A and 7B on approach to one another, prior to mating.

FIG. 9 illustrates a cross-sectional view of the ports 700, 790 on approach to one another, prior to mating. The pintle tips 805 in each of the ports 700, 790 can protrude slightly from the port faces 740, 792, as each pintle 787 is biased toward its respective port face 740, 792 by the spring 815. Prior to mating, the O-rings 820 on the pintles 787 (which can alternatively be carried by the port bodies 710) seal the ports 700, 790 and prevent material from passing through the ports 700, 790.

Figure 10:
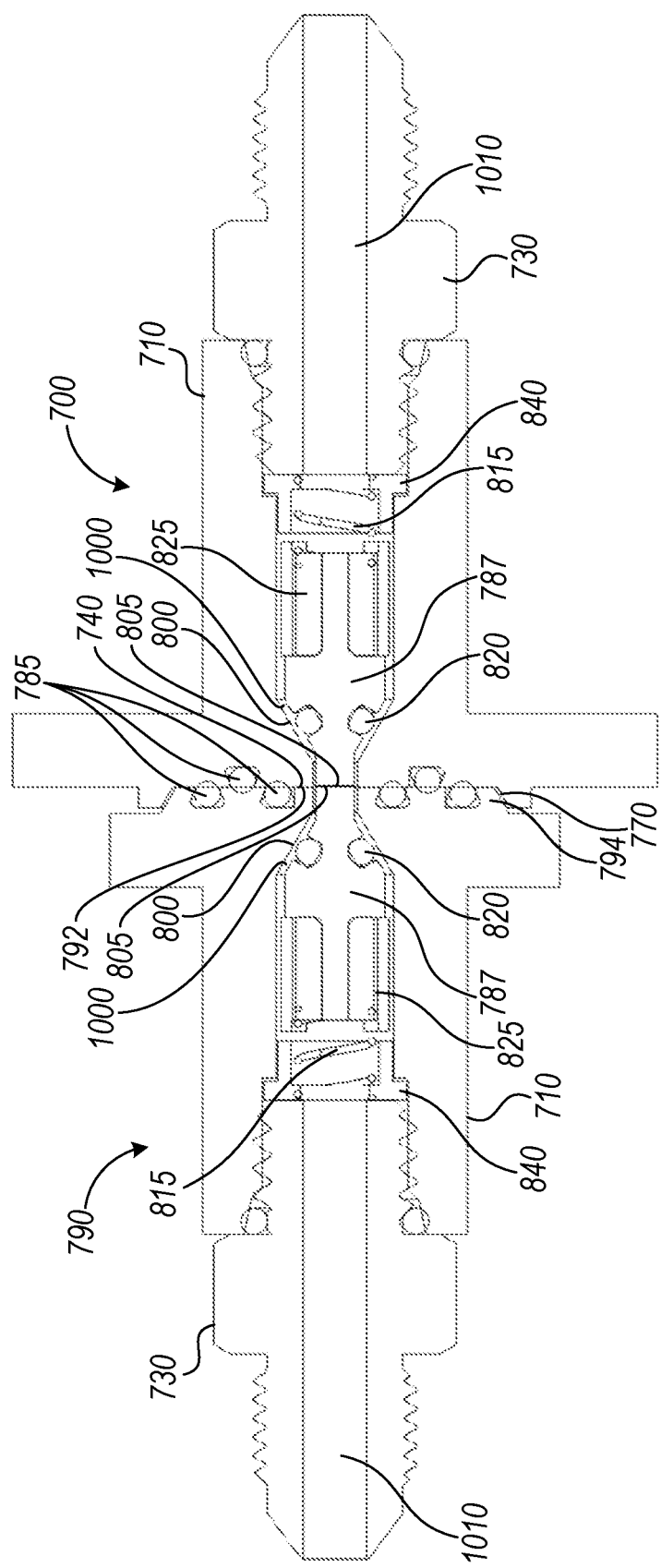
FIG. 10 illustrates a cross-sectional view of the ports shown in FIGS. 7A and 7B, mated or engaged to each other.

FIG. 10 illustrates a cross-sectional view of the ports 700, 790 mated or engaged to each other. One aspect of embodiments of the present technology includes a self-centering capability of the ports 700, 790. The ports 700, 790 need not approach each other at a precise orientation because the cup portion 770 receives the cone 794 in a manner that aligns the cup and cone to be coaxial. Another aspect of embodiments of the present technology includes a seal between the port faces 740, 792. The three O-rings 785 between the faces 740, 792 provides redundancy and compliance with regulatory standards (e.g., regulatory standards related to hypergolic fuels). In some embodiments, there can be more or fewer than three O-rings 785. Distributing the O-rings 785 between the two ports 700, 790 (e.g., two O-rings 785 on one of the ports 790 and one O-ring on the other port 700) also provides redundancy. For example, if one of the ports 700, 790 is damaged (e.g., by micrometeoroids or debris), the O-rings 785 on the other port can be sufficient to provide a seal. Although O-rings are described herein in the context of the port faces 740, 792 and the pintles 787, other sealing devices may be used in further embodiments (such as crushable seals or other suitable sealing devices). Systems in which the port faces 740, 792 include multiple O-rings or multiple other sealing devices may further include one or more measurement devices to assist determination of a status of the sealing devices (for example, to help determine if they are functioning adequately). A measurement device may include a pressure measurement device to measure pressure between each O-ring or other sealing device. In some embodiments, O-rings or other sealing devices on the port faces can be omitted.

In operation, the pintle tips 805 push each other, which forces each pintle 787 to retract into the port body 710 (for example, against the force of the spring 815). Movement of the pintle 787 into the port body 710 opens a passage 1000 between the bore 800 and the pintle 787. Material is then free to flow through the engaged ports 700, 790 without escaping the seal created by the port faces 740, 792. For example, material can flow through a passageway 1010 in the connector element 730, through the spring retainer 840, around the spring 815, past the bore rider 825 (for example, by flowing through the slots 835 illustrated in FIG. 8), and past the pintle 787, out of the opening 810 in the port face (see FIG. 8), and into the other port, to flow past the same or similar components in the other port.

Figure 11:
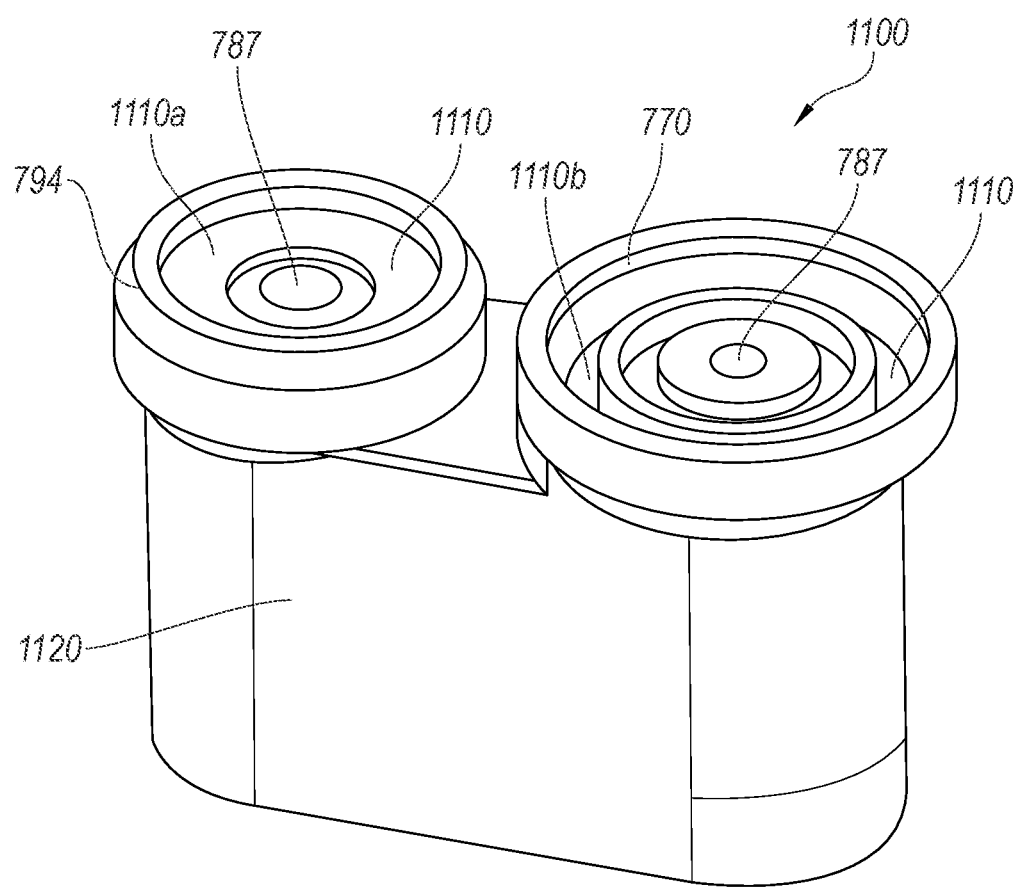
FIG. 11 illustrates a perspective view of a port assembly configured in accordance with embodiments of the present technology.

FIG. 11 illustrates a perspective view of a port assembly 1100 configured in accordance with embodiments of the present technology. The port assembly 1100 can include two or more port faces 1110 supported on a single port body 1120. The port faces 1110 can be similar to the port faces 740, 792 described above with regard to FIGS. 7A-10. For example, one port face 1110a can include a cone 794 and another port face 1110b can include a cup portion 770. A port assembly 1100 can be carried in one or more of the service valve portion 105, the space coupling portion 110, or the ground coupling portion 600 to provide the ports 135, 145 (see FIGS. 1A-2 and 4B). The port body 1120 also carries a set of port components (e.g., a pintle 787, a bore rider, a spring, O-rings, and a spring retainer as described above) for each port face 1110. Accordingly, the port assembly 1100 constitutes two ports configured in accordance with embodiments of the present technology, but in one port body 1120. Although two ports are described in one port body 1120, the same port body 1120 can include more than two ports. Although one port face includes a cup and another includes a cone, in some embodiments, any suitable number of cups and cones can be used as the port faces. The port assembly 1100 can mate or engage with another port assembly in another system. For example, with additional regard to FIG. 1A, the service valve portion 105 can include a port assembly 1100 as the ports 135a, 135b and the space coupling portion 110 can include a port assembly 1100 as the ports 145a, 145b. When the service valve portion 105 engages the space coupling portion 110, the port assemblies 1100 would be pressed together to form a seal and to enable passage of materials between the port assemblies 1100.

For general context, in some embodiments, components such as the service valve portion 105, the space coupling portion 110, and/or the ground coupling portion 600 can be sized to fit within a small satellite deployer, such as a CubeSat deployer. For example, in some embodiments, the service valve portion 105 and/or the space coupling portion 110 can be sized to fit within the cylindrical recess of a CubeSat deployer (colloquially known as the "tuna can" volume). In further embodiments, dimensions can be scaled up and down to be larger or smaller. Valves and ports configured in accordance with embodiments of the present disclosure may be used as service valves, fill/drain valves, fill/vent valves, or as other valves for spacecraft or other systems.

In some embodiments, conduits associated with the ports can be thermally coupled with the heaters for the wax motors (or thermally coupled to any actuators that produce heat) to use waste heat for controlling the temperature of the materials in the conduits (e.g., to de-ice fluids). In other embodiments, insulation can be positioned between the conduits and the heaters for the wax motors. In some embodiments, force from the springs 815 can assist with pushing apart ports, which can assist with separating the service valve portion 105 from the space coupling portion 110, or separating other devices.

From the foregoing, it will be appreciated that some embodiments of the present technology have been described herein for purposes of illustration, but various modifications can be made without deviating from the disclosed technology. For example, more or fewer ports (such as 1, 3, 4, or more ports) can be used to connect the valve and coupling portions. Although a cup-and-cone arrangement is described above with regard to the faces of the ports, in some embodiments, other cooperating shapes may be implemented to create a concentric alignment. In some embodiments, the service valve portion 105 and/or the space coupling portion 110 can be positioned on the outside of a spacecraft (i.e., outside of thermal insulation). In some embodiments, one or both of the portions 105, 110 can be positioned behind a movable cap or cover. Generally, the portions 105, 110 can be positioned in any suitable location that facilitates docking and material transfer. In some embodiments, one or more surfaces of elements of the technology can include conductive surfaces or coatings to resist accumulation of a static charge.

Further, while advantages associated with some embodiments of the technology have been described in the context of those embodiments, some embodiments may also exhibit said advantages, and not all embodiments need necessarily exhibit such advantages to fall within the scope of the present technology. Accordingly, the present disclosure and associated technology can encompass other embodiments not expressly described or shown herein.

To the extent any materials incorporated herein by reference conflict with the present disclosure, the present disclosure controls. As used herein, the terms "about" and "approximately" refer to values within 10% of the stated value.

We claim:

1. A system for transferring material between two spacecraft, the system comprising:
   a service valve portion including one or more first ports for transferring material; and
   a coupling portion positioned to receive the service valve portion, wherein the coupling portion comprises:
   a support structure;
   one or more second ports positioned to engage the one or more first ports for transferring material therebetween;
   a latch-arm base, wherein the latch-arm base is movable relative to the support structure;
   a first actuator positioned to move the latch-arm base relative to the support structure;
   a latch arm carried by the latch-arm base, the latch arm being movable relative to the latch-arm base; and
   a second actuator positioned to rotate the latch arm relative to the latch-arm base.

2. The system of claim 1, wherein the coupling portion further comprises one or more sensors, wherein each sensor of the one or more sensors is configured to output a signal.

3. The system of claim 2, wherein the one or more sensors comprises any one or more of:
   a proximity sensor, wherein the signal indicates proximity between the service valve portion and the coupling portion;
   a contact sensor, wherein the signal indicates contact between the service valve portion and the coupling portion;

an optical sensor, wherein the signal indicates proximity or contact between the service valve portion and the coupling portion; or an aliveness sensor, wherein the signal indicates a power state of at least one of the spacecraft.

4. The system of claim 2, further comprising a controller programmed with instructions that, when executed:
receive at least one of the signals from the one or more sensors; and
in response to the at least one signal, operate the first actuator to translate the latch-arm base and the latch arm to a position in which the latch arm presses the service valve portion against the coupling portion.

5. The system of claim 4, wherein the controller is further programmed with instructions that, when executed:
operate the second actuator to rotate the latch arm from a first position to a second position in which the latch arm captures the service valve portion.

6. The system of claim 1, wherein the latch-arm base is connected to the support structure via one or more flexible elements.

7. The system of claim 1, wherein the latch arm is movable relative to the latch-arm base between a first position and a second position, the system further comprising a spring positioned to bias the latch arm toward the first position.

8. The system of claim 1, wherein the first actuator comprises a wax motor.

9. The system of claim 1, wherein the latch-arm base is movable relative to the support structure between a first position and a second position, the system further comprising a spring positioned between the latch-arm base and the support structure to bias the latch-arm base toward the first position.

10. The system of claim 1, wherein each of the service valve portion and the coupling portion include at least one of (a) a data connector for transferring data between the spacecraft, or (b) a power connector for transferring power between the spacecraft.

11. A system for transferring material between two spacecraft, the system comprising:
a service valve portion including one or more first ports for transferring material; and
a coupling portion positioned to receive the service valve portion, wherein the coupling portion comprises:
a support structure;
one or more second ports positioned to engage the one or more first ports for transferring material therebetween;
a latch-arm base, wherein the latch-arm base is connected to the support structure via one or more flexible elements, and wherein the latch-arm base is movable relative to the support structure;
a first actuator positioned to move the latch-arm base relative to the support structure; and
a latch arm carried by the latch-arm base, the latch arm being movable relative to the latch-arm base.

12. The system of claim 11, further comprising a controller programmed with instructions that, when executed:
receive at least one signal from at least one sensor; and
in response to the at least one signal, operate the first actuator to translate the latch-arm base to a position in which the latch arm presses the service valve portion against the coupling portion.

13. The system of claim 12, further comprising a second actuator positioned to rotate the latch arm relative to the latch-arm base, wherein the controller is further programmed with instructions that, when executed:
operate the second actuator to rotate the latch arm from a first position to a second position in which the latch arm captures the service valve portion.

14. A system for transferring material between two spacecraft, the system comprising:
a service valve portion including one or more first ports for transferring material; and
a coupling portion positioned to receive the service valve portion, wherein the coupling portion comprises:
a support structure;
one or more second ports positioned to engage the one or more first ports for transferring material therebetween;
a latch-arm base, wherein the latch-arm base is movable relative to the support structure;
a first actuator positioned to move the latch-arm base relative to the support structure;
a latch arm carried by the latch-arm base, wherein the latch arm is movable relative to the latch-arm base between a first position and a second position; and
a spring positioned to bias the latch arm toward the first position.

15. The system of claim 14, further comprising a controller programmed with instructions that, when executed:
receive at least one signal from at least one sensor; and
in response to the at least one signal, operate the first actuator to translate the latch-arm base to a position in which the latch arm presses the service valve portion against the coupling portion.

16. The system of claim 14, further comprising a second actuator positioned to rotate the latch arm relative to the latch-arm base, and a controller programmed with instructions that, when executed:
operate the second actuator to rotate the latch arm from the first position to a second position in which the latch arm captures the service valve portion.

17. A system for transferring material between two spacecraft, the system comprising:
a service valve portion including one or more first ports for transferring material; and
a coupling portion positioned to receive the service valve portion, wherein the coupling portion comprises:
a support structure;
one or more second ports positioned to engage the one or more first ports for transferring material therebetween;
a latch-arm base, wherein the latch-arm base is translatable relative to the support structure;
a first actuator positioned to translate the latch-arm base relative to the support structure; and
a latch arm carried by, and pivotably connected to, the latch-arm base, wherein the latch arm is pivotable between a first pivot position in which the latch arm is pivoted outwardly, and a second pivot position in which the latch arm is pivoted inwardly to capture the service valve portion;
wherein the latch-arm base is translatable relative to the support structure between a first position in which the latch arm allows the service valve portion to move relative to the coupling portion, and a second position in which the latch arm presses the service valve portion against the coupling portion.

18. The system of claim 17, further comprising a controller programmed with instructions that, when executed:
receive at least one signal from one or more sensors; and in response to the at least one signal, operate the first actuator to translate the latch-arm base from the first position to the second position.

19. The system of claim 17, further comprising a second actuator positioned to pivot the latch arm relative to the latch-arm base, and a controller programmed with instructions that, when executed:

operate the second actuator to pivot the latch arm from the first pivot position to the second pivot position.

* * * * *